United States Patent
Hong et al.

(10) Patent No.: US 10,803,785 B2
(45) Date of Patent: Oct. 13, 2020

(54) ELECTRONIC DEVICE AND METHOD FOR CONTROLLING OUTPUT TIMING OF SIGNAL CORRESPONDING TO STATE IN WHICH CONTENT CAN BE RECEIVED BASED ON DISPLAY LOCATION OF CONTENT DISPLAYED ON DISPLAY

(71) Applicant: Samsung Electronics Co., Ltd., Gyeonggi-do (KR)

(72) Inventors: Yunpyo Hong, Seoul (KR); Jong-Kon Bae, Seoul (KR); Yohan Lee, Seoul (KR); Dongkyoon Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/227,300

(22) Filed: Dec. 20, 2018

(65) Prior Publication Data

US 2019/0189048 A1     Jun. 20, 2019

(30) Foreign Application Priority Data

Dec. 20, 2017   (KR) .......................... 10-2017-0176541

(51) Int. Cl.
*G09G 3/20*      (2006.01)
*G06F 1/3234*    (2019.01)
*G09G 5/393*     (2006.01)

(52) U.S. Cl.
CPC .......... *G09G 3/2096* (2013.01); *G09G 5/393* (2013.01); *G06F 1/3234* (2013.01);
(Continued)

(58) Field of Classification Search
CPC .............. G06F 1/3203–3296; G09G 2330/021
See application file for complete search history.

(56) References Cited

U.S. PATENT DOCUMENTS 8,334,857  B1   12/2012  Ogrinc et al.
2004/0135789 A1  7/2004  Yu
(Continued)

FOREIGN PATENT DOCUMENTS

KR   1020170008698   1/2017
KR   1020170048957   5/2017

OTHER PUBLICATIONS

International Search Report dated Mar. 4, 2019 issued in counterpart application No. PCT/KR2018/016065, 7 pages.
(Continued)

*Primary Examiner* — Ryan McCulley
(74) *Attorney, Agent, or Firm* — The Farrell Law Firm, P.C.

(57) ABSTRACT

An electronic device includes a display panel; a processor; and display driving integrated circuitry (DDIC). The DDIC is configured to control the display panel and includes an internal memory. The DDIC is configured to receive, from the processor while the processor operates in an active state, a first content including a plurality of images to be displayed based on a specified order through the display panel while the processor operates in a low-power state; store the first content in the internal memory; change a timing for outputting a signal corresponding to a state capable of receiving a second content based on a change of a location in which an image among the plurality of images is displayed through the display panel while the processor operates in the low-power state; and output the signal to the processor based on the changed timing.

6 Claims, 15 Drawing Sheets

(52) U.S. Cl.
CPC ..... *G09G 2310/08* (2013.01); *G09G 2320/10* (2013.01); *G09G 2330/022* (2013.01); *G09G 2340/02* (2013.01); *G09G 2360/10* (2013.01); *G09G 2360/127* (2013.01); *G09G 2360/18* (2013.01)

(56) References Cited

U.S. PATENT DOCUMENTS

| | | | |
|---|---|---|---|
| 2008/0278421 A1* | 11/2008 | Inoue ................... | G09G 3/3208 345/77 |
| 2014/0281607 A1* | 9/2014 | Tse ......................... | G09G 5/399 713/320 |
| 2014/0340286 A1* | 11/2014 | Machida ............ | G02B 27/0172 345/8 |
| 2015/0130824 A1 | 5/2015 | Lee et al. | |
| 2015/0228048 A1 | 8/2015 | Heo et al. | |
| 2016/0109934 A1 | 4/2016 | Woo et al. | |
| 2016/0274738 A1* | 9/2016 | Hsiao ................... | G06F 9/5027 |
| 2017/0116927 A1 | 4/2017 | Bae et al. | |
| 2017/0308226 A1 | 10/2017 | Yoo et al. | |
| 2018/0204303 A1 | 7/2018 | Bae et al. | |

OTHER PUBLICATIONS

European Search Report dated Jul. 27, 2020 issued in counterpart application No. 18892234.8-1209, 10 pages.

* cited by examiner

ELECTRONIC DEVICE AND METHOD FOR CONTROLLING OUTPUT TIMING OF SIGNAL CORRESPONDING TO STATE IN WHICH CONTENT CAN BE RECEIVED BASED ON DISPLAY LOCATION OF CONTENT DISPLAYED ON DISPLAY

CROSS-REFERENCE TO RELATED APPLICATION(S)

This application is based on and claims priority under 35 U.S.C. § 119 to Korean Patent Application No. 10-2017-0176541, filed on Dec. 20, 2017, in the Korean Intellectual Property Office, the disclosure of which is incorporated by reference herein in its entirety.

BACKGROUND

1. Field

The present disclosure relates generally to an electronic device and, particularly to an electronic device and method for controlling output timing of a signal corresponding to a state in which content can be received based on a display location of the content displayed on a display.

2. Description of Related Art

Electronic devices such as smart phones, tablet personal computers (PCs), and smart watches may display various kinds of content, including images and text, through a display panel. The display panel may be driven through display driving integrated circuitry (DDIC).

The DDIC may store, in units of frames, data on an image to be displayed through each of a plurality of pixels included in the display panel and display the image through the display panel according to a predetermined timing signal.

An electronic device may store information on an image to be displayed through a display panel in a memory within the DDIC functionally coupled to the display panel.

The electronic device may provide an always-on-display (AOD) mode, in which an image is displayed through the display panel while a processor of the electronic device is in a sleep state. In the AOD mode, the display driving integrated circuitry may provide animation through the display panel by sequentially scanning a plurality of partial images included in an image stored in a memory within the DDIC. In the AOD mode, since the processor is in the sleep state, the processor cannot recognize an image to be scanned among the plurality of partial images. Such a lack of awareness may cause an unwanted tearing effect (i.e., when multiple frames are displayed on a single screen) within the electronic device.

SUMMARY

The present disclosure has been made to address the above-mentioned problems and disadvantages, and to provide at least the advantages described below.

In accordance with an aspect of the present disclosure, an electronic device is provided that includes a display panel; a processor; and DDIC configured to control the display panel and comprising an internal memory. The DDIC is configured to, while the processor operates in an active state, receive a first content including a plurality of images to be displayed from the processor based on a specified order through the display panel while the processor operates in a low-power state; store the first content in the internal memory; change a timing for outputting a signal corresponding to a state capable of receiving a second content based on a change of a location in which an image among the plurality of images is displayed through the display panel while the processor operates in the low-power state; and output the signal to the processor based on the changed timing.

In accordance with another aspect of the present disclosure, an electronic device is provided that includes a display panel; DDIC comprising an internal memory and operably coupled to the display panel; and a processor operably coupled to the DDIC. The DDIC is configured to, while the processor is in a sleep state, scan a first partial image among a plurality of first partial images included in a first image stored in the internal memory; while the processor is in the sleep state, identify that a scan of the first partial image is completed; and while the processor is in the sleep state, transmit a signal associated with a timing that writes data in the internal memory to the processor in response to the identification.

In accordance with another aspect of the present disclosure, an electronic device is provided that includes a display panel; DDIC comprising an internal memory and operably coupled to the display panel; and a processor operably coupled to the DDIC. The DDIC is configured to, while the processor is in a sleep state, scan a first partial image among a plurality of partial images included in an image written in the internal memory; while the processor is in the sleep state, identify whether the first partial image corresponds to a partial image written in a designated area of the internal memory; and while the processor is in the sleep state, transmit a signal for indicating a timing for writing data in the internal memory to the processor based on identifying that the first partial image corresponds to the partial image written in the designated area of the internal memory.

In accordance with another aspect of the present disclosure, an electronic device is provided that includes a display panel; DDIC comprising an internal memory; and a processor operably coupled to the DDIC. The DDIC is configured to receive, from the processor, a data set; and initiate to store the data set in an area corresponding to a first address which is before an initial address among a plurality of addresses configured in the internal memory.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
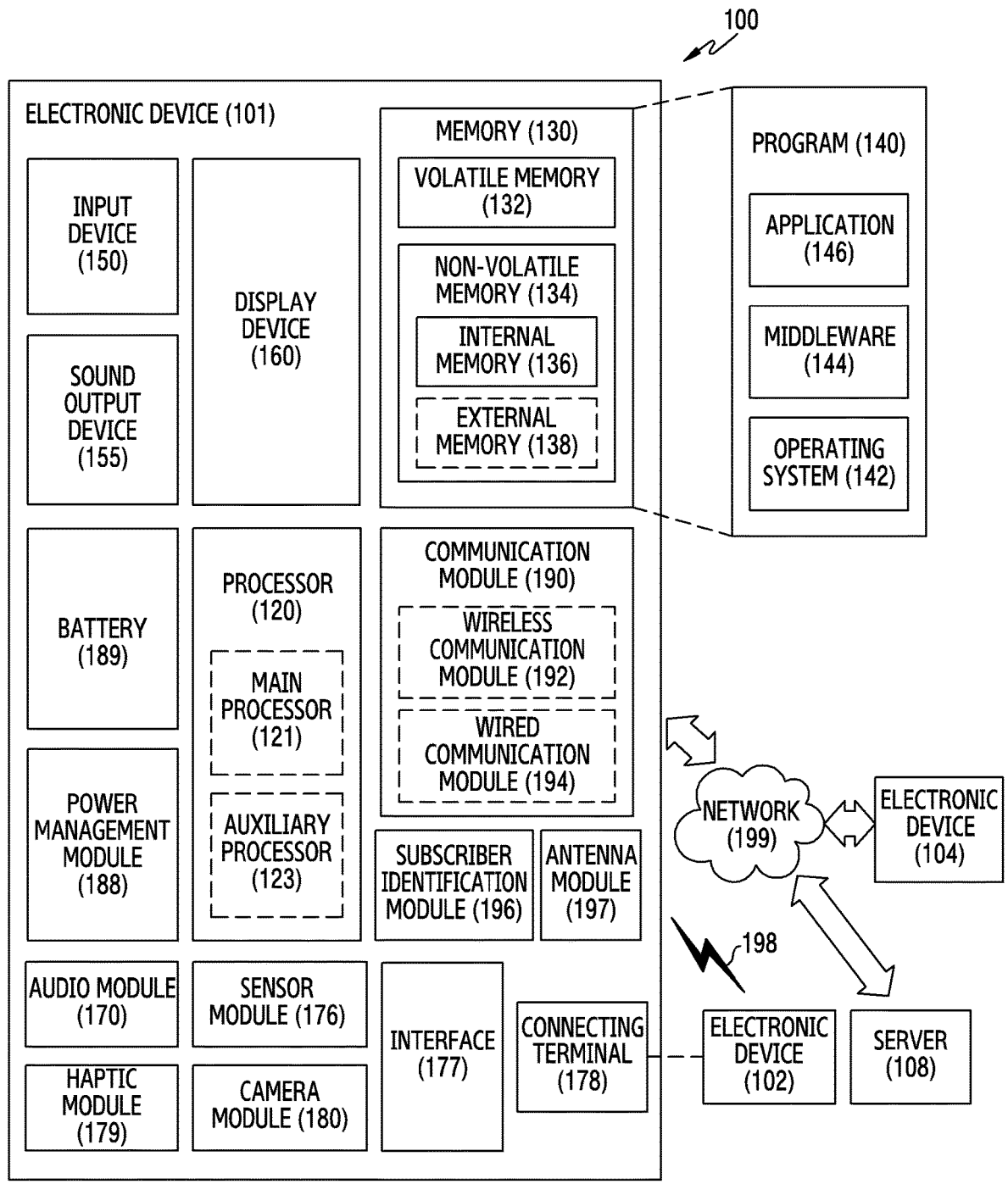
FIG. 1 is a block diagram illustrating an electronic device within a network environment, according to an embodiment.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
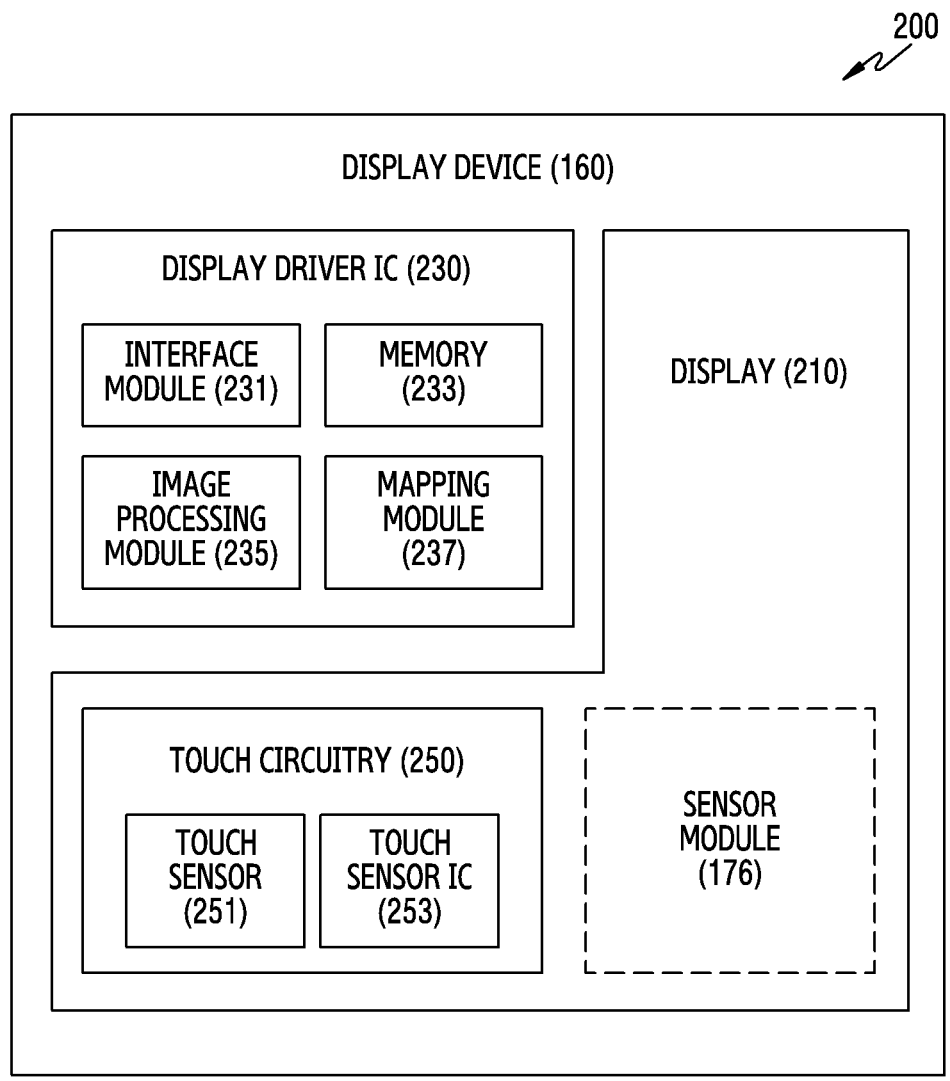
FIG. 2 is a block diagram illustrating a display device, according to an embodiment.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
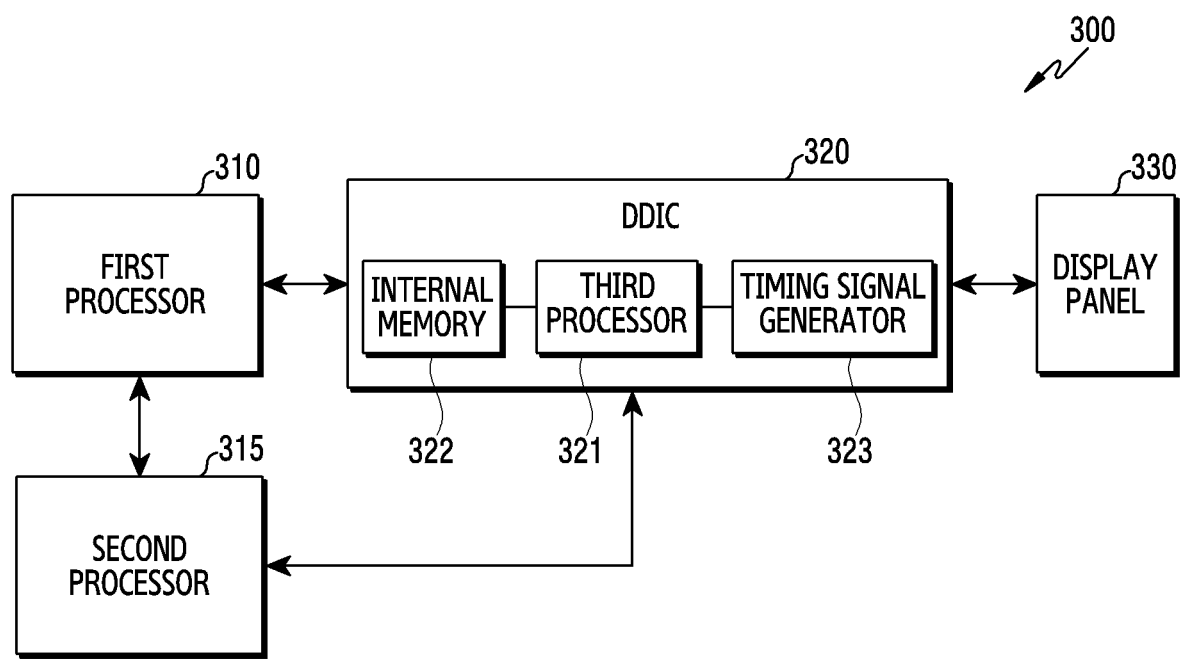
FIG. 3 illustrates an example of a functional configuration of an electronic device, according to an embodiment.

FIG. 3 illustrates an example of a functional configuration of an electronic device, according to an embodiment. The functional configuration may be included in the electronic device 101 illustrated in FIG. 1.

Referring to FIG. 3, an electronic device 300 includes a first processor 310, a second processor 315, DDIC 320, and a display panel 330.

The first processor 310 may include the main processor 121 illustrated in FIG. 1, the second processor 315 may include the auxiliary processor 123 illustrated in FIG. 1, the DDIC 320 may include the display driver IC 230 illustrated in FIG. 2, and the display panel 330 may include the display 210 illustrated in FIG. 2.

The first processor 310 may identify whether to switch a driving mode (or an operation mode) (e.g., a screen mode) of the electronic device 300. The driving mode may include a normal mode and an AOD mode. In the normal mode, the first processor 310 may display a screen through the display panel 330 during a wake-up state. In the wake-up state, a PMIC of the electronic device 300 provides steady-state power to the first processor 310. In the normal mode, the first processor 310 may displays a screen.

The first processor 310 displays the screen through the display panel 330 by controlling the DDIC 320.

In the AOD mode, the display panel 330 is on during the sleep state. The sleep state may include a turned-off state in which booting is required in order to switch to the wake-up state, a state in which provision of power from the PMIC of the electronic device 300 to the first processor 310 is limited (e.g., stopped), a state in which the first processor 310 does not require booting to switch to an active state but requires acquisition of steady-state power from the PMIC, or a state in which power lower than reference power is acquired from the PMIC of the electronic device 300. The sleep state may include one or more of an inactive state, an idle state, a standby state, and a low-power state.

In the AOD mode, the first processor 310 may be in the sleep state during at least a part of the interval in which the screen is displayed through the display panel 330. The AOD mode may correspond to a state in which power is acquired from an internal power source of the DDIC 320. The AOD mode may be referred to as a self-display mode from the aspect of screen display according to the operation of the DDIC 320 itself.

The first processor 310 may identify whether to switch the driving mode of the electronic device 300 from the normal mode to the AOD mode or whether to switch the driving mode of the electronic device 300 from the AOD mode to the normal mode. For example, the first processor 310 may monitor whether user input is detected for a predetermined time based on a timer included in the electronic device 300, maintain the driving mode as the normal mode based on detecting the user input for the predetermined time, and switch the driving mode to the AOD mode when the user input is not detected for the predetermined time. In another example, the first processor 310 may monitor whether user input for deactivating the display panel 330 of the electronic device 300 is detected and switch the driving mode from the normal mode to the AOD mode when the user input for deactivating the display panel 330 is detected.

When the screen is identified as being switched to the AOD mode, the first processor 310 may provide or transmit information indicating the switching of the driving mode of the electronic device 300 to the AOD mode to the DDIC 320. For example, information indicating the switching of the driving mode of the electronic device 300 to the AOD mode may be stored in a register, a graphical random access memory (GRAM), or a side memory included in the DDIC 320.

The first processor 310 may provide or transmit, to the DDIC 320, information on a first image to be displayed through the display panel 330 while the electronic device 300 operates in the AOD mode. The first image may include a plurality of first partial images. The plurality of first partial images may be associated with each other in order to provide animation in the AOD mode. The information on the first image may include control information used to display the first image. For example, the control information may include one or more pieces of data indicating an address of an area in which the first image is stored, data indicating a size of the first image, and data indicating a location at which the first image is displayed.

Figure 4:
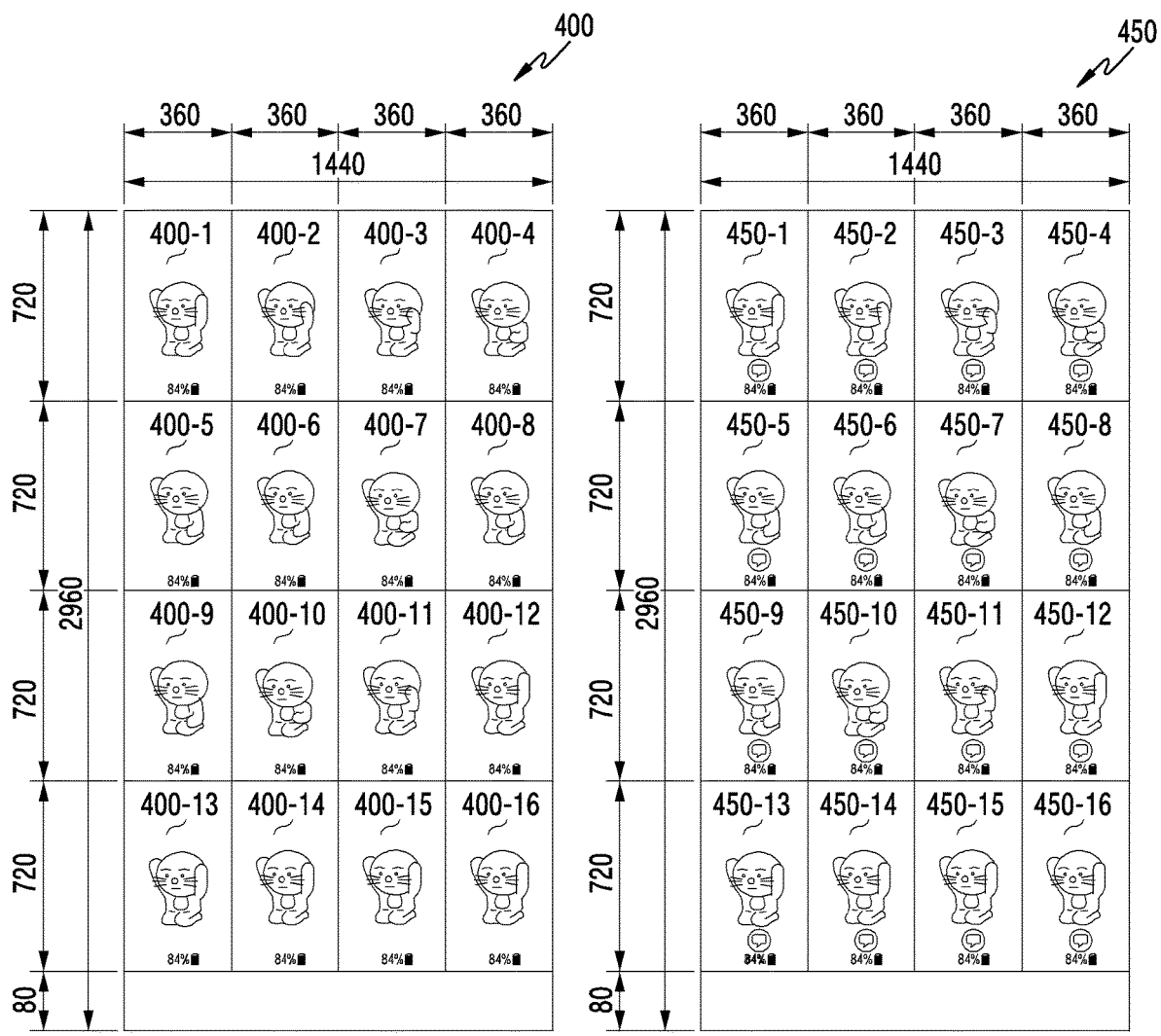
FIG. 4 illustrates an example of images stored in the electronic device, according to an embodiment.

FIG. 4 illustrates an example of images stored in the electronic device, according to an embodiment.

Referring to FIG. 4, the first processor 310 may transmit the information on the first image, such as an image 400, to the DDIC 320. For example, the image 400 may include 16 first partial images (e.g., a partial image 400-1 to a partial image 400-16). As illustrated in FIG. 4, the plurality of first partial images may be concatenated.

The first processor 310 may transmit information on the image corresponding to the plurality of first partial images, concatenated with each other, to the DDIC 320. The first processor 310 may transmit the information on the first image to the DDIC 320 through a high-speed serial interface (HSSI) (for example, a mobile industry processor interface (MIPI)). The information on the first image may be stored in an external memory 322 within the DDIC 320.

The first processor 310 may compress the first image in order to transmit the first image to the DDIC 320. The first processor 310 may transmit the compressed information on the first image to the DDIC 320.

The first processor 310 may provide or transmit information for identifying each of the plurality of first partial images included in the first image to the DDIC 320. The information for identifying each of the plurality of first partial images may be used by a third processor 321 within the DDIC 320 to sequentially scan (or read) the plurality of first partial images in the AOD mode. Information for specifying or identifying each of the plurality of first partial images may include at least one of a size of each of the plurality of first partial images and a number of the plurality of first partial images. The first processor 310 may transmit the information for identifying each of the plurality of first partial images to the DDIC 320 through a low-speed serial interface (LoSSI) (for example, a serial peripheral interface (SPI) or an inter integrated circuit (I2C)). The information for identifying each of the plurality of first partial images may be stored in the register, the GRAM, or the side memory within the DDIC 320.

The second processor 315 may detect an event related to the electronic device 300 while the first processor 310 is in the sleep state. The event may indicate the context in which a change in the display of the first image provided in the AOD mode is needed. The event may include reception of a message (for example, a short messaging service (SMS) message, a multimedia messaging service (MMS) message, or a message related to a message application) from another electronic device. Alternatively, the event may include acquisition of information such as weather or news from another electronic device, or the event may include a reduction in the remaining capacity of a battery of the electronic device 300.

The second processor 315 may transmit a signal (hereinafter, referred to as an event detection signal) indicating detection of the event to the first processor 310 or the PMIC within the electronic device 300. The first processor 310 may switch from the sleep state to the wake-up state based on the event detection signal. The second processor 315 may directly transmit the event detection signal to the DDIC 320. For example, the second processor 315 may transmit the event detection signal to the DDIC 320 while the first processor 310 is in the sleep state. In this case, the event detection signal may include control information related to input (e.g., touch input) for the electronic device 300 and control information (e.g., control information for compensating for an error in the time indicated by a clock when the first image indicates the clock) for changing at least a part of the data included in the first image.

The first processor 310 may generate a second image related to the event based on switching to the wake-up state. The electronic device 300 may operate in the AOD mode while the second image is generated. The second image may be an image generated by updating, refining, or changing the first image. The second image may include a plurality of second partial images. The plurality of second partial images may be associated with each other in order to provide animation in the AOD mode. Each of the plurality of second partial images may be an image generated by adding at least one visual object indicating the event to each of the plurality of first partial images.

FIG. 4 illustrates an example of images stored in the electronic device, according to an embodiment.

Referring to FIG. 4, the first processor 310 may generate information on the second image, such as an image 450, which may include 16 second partial images (e.g., a partial image 450-1 to a partial image 450-16). As illustrated in FIG. 4, the plurality of second partial images may be concatenated. Each of the plurality of second partial images may be concatenated with each of the plurality of first partial images. Each of the plurality of second partial images may further include at least one visual object indicating the event, relative to each of the plurality of first partial images. Each of the plurality of second partial images may further include an icon for providing notification of reception of a message, relative to (or compared to) each of the plurality of first partial images.

The first processor 310 may provide or transmit, to the DDIC 320, information on the second image to be displayed through the display panel 330 while the electronic device 300 operates in the AOD mode. The first processor 310 may transmit the information on the second image to the DDIC 320 through the high-speed serial interface. The information on the second image may be stored in the external memory 322 within the DDIC 320. The internal memory 322 may include one or more of a GRAM, a side memory, and a register (e.g., referred to as a command controller). The GRAM and the side memory may be implemented as two different memories. The GRAM and the side memory may be implemented as a single memory. When the GRAM and the side memory are implemented as a single memory, the GRAM and the side memory may be implemented in independent storage spaces.

The first processor 310 may compress the second image in order to transmit the second image to the DDIC 320. The first processor 310 may transmit the compressed information on the second image to the DDIC 320. The compression of the second image may be bypassed or omitted.

The first processor 310 may provide or transmit information for identifying each of the plurality of second partial images included in the second image to the DDIC 320. The information for identifying each of the plurality of second partial images may be configured to be similar to the information for identifying each of the plurality of first partial images. The first processor 310 may transmit the information for identifying each of the plurality of second partial images to the DDIC 320 through a low-speed serial interface. The information for identifying each of the plurality of second partial images may be stored in the register, the GRAM, or the side memory within the DDIC 320.

The DDIC 320 may drive the display panel 330. The DDIC 320 may transmit a signal corresponding to data (e.g., the first image or the second image) received from a host (e.g., the processor) to the display panel 330 based on a frame rate. The processor may include one or more of the first processor 310 and the second processor 315.

The DDIC 320 may include the third processor 321, the internal memory 322, and a timing signal generator 323.

The third processor 321 may store or write data received from the processor in the internal memory 322. The third processor 321 may scan the data stored in the internal memory 322.

The third processor 321 may be configured to display at least a part of the data stored in the internal memory 322 in a predetermined area of the display panel 330. When the first image (or the second image) including the plurality of first partial images (or the plurality of second partial images) is stored in the internal memory 322, the third processor 321 may be configured to display at least one partial image among the plurality of first partial images (or the plurality of second partial images) through the display panel 330. In order to identify at least one image among the plurality of first partial images (or the plurality of second partial images), the third processor 321 may use an address set in the internal memory 322 and/or sizes of the plurality of first partial images (or the plurality of second partial images).

The third processor 321 may identify or specify a partial image having a predetermined size as a particular image to be output through the display panel 330 based on a particular address.

The third processor 321 may be configured to change at least one partial image to be output in a predetermined area of the display panel 330 according to a predetermined order. The third processor 321 may sequentially display the plurality of first partial images (or the plurality of second partial images) through the display panel 330 by sequentially shifting addresses by which data stored in the internal memory 322 are scanned at a predetermined interval at a predetermined period. The predetermined period may be changed according to the driving mode. For example, when the driving mode is the normal mode, the predetermined period may be configured to be 60 hertz (Hz). When the driving mode is the AOD mode, the predetermined period may be configured to be 30 Hz. The third processor 321 may include one or more of an interface controller, a command controller, and a GRAM controller.

The internal memory 322 may store the data received from the processor. The internal memory 322 may include a memory space corresponding to a resolution and/or a number of color gradations of the display panel 330. The internal memory 322 may be referred to as a frame buffer or a line buffer.

The timing signal generator 323 may generate a timing signal (or a synchronization signal) used by one or more of the first processor 310, the second processor 315, the DDIC 320, and the display panel 330. The timing signal generator 323 may generate a timing signal (e.g., a vertical synchronization signal and/or a horizontal synchronization signal) for controlling the timing at which the screen is displayed through the display panel 330.

The timing signal generator 323 may generate a timing signal (e.g., a tearing effect (TE) signal) for controlling the timing at which the first processor 310 or the second processor 320 stores data in the internal memory 322. Further, the timing signal generator 323 may generate a timing signal (e.g., a touch vertical synchronization signal and/or a touch horizontal synchronization signal) for controlling the operation of the touch sensor IC 253 included in the electronic device 300. The timing signal generator 323 may generate the timing signal based at least on information received from the third processor 321. The timing signal generator 323 may be referred to as a timing controller.

The display panel 330 may display information. The display panel 330 may be configured as a liquid-crystal display (LCD) or an organic light-emitting diode (OLED). The display panel 330 may be implemented to be flexible, transparent, or wearable. The display panel 330 may be included in a cover of a case coupled to the electronic device 300.

The display panel 330 may display the screen based on a signal received from the DDIC 320. The display panel 330 may include a plurality of data lines and a plurality of gate lines. The plurality of data lines and the plurality of gate lines may cross on the display panel 330. A plurality of pixels may be arranged in an area in which the plurality of data lines and the plurality of gate lines cross each other. When the display panel 330 is configured as an OLED panel, each of the plurality of pixels may include at least one switching element and one OLED. Each of the plurality of pixels may emit light based on the signal received from the DDIC 320.

The first processor 310 may transmit information on the first image to the DDIC 320 before the electronic device 300 enters the AOD mode, and may transmit information on the second image to the DDIC 320 while the electronic device 300 operates in the AOD mode. For example, in order to enter the AOD mode, the first processor 310 may switch the state of the first processor 310 from the wake-up state to the sleep state after transmitting the information on the first image to the DDIC 320. The first processor 310 may detect an event indicating a change in the display of the first image through the second processor 315 in the sleep state while the electronic device 300 provides the AOD mode. The first processor 310 may switch to the wake-up state based on the detection while the electronic device 300 provides the AOD mode. In order to indicate occurrence of the event, the first processor 310 in the wake-up state may update or change the first image and thus acquire the second image. Since the first processor 310 is in the sleep state from the time point at which the first processor 310 enters the AOD mode to the time point at which the first processor 310 switches to the wake-up state, the first processor 310 may not recognize which partial image among the plurality of first partial images in the first image is scanned by the DDIC 320. When the first processor 310 transmits the second image at a predetermined time point or stores the second image at a predetermined location within the internal memory 322, a tearing effect may be unintentionally caused during the process in which the DDIC 320 displays (or scans) at least one of the plurality of second partial images included in the second image. In order to prevent the tearing effect, the electronic device 300 and a method for controlling the timing at which the second image is transmitted to the DDIC 320 or controlling the location at which the second image is stored in the internal memory 322 may be provided.

The DDIC 320 may be configured to scan one of the plurality of first partial images included in the first image stored in the internal memory 322 while the first processor 310 is in the sleep state. The plurality of first partial images may be associated with each other or concatenated with each other in order to display animation through the display panel 330 while the electronic device 300 operates in the AOD mode, as illustrated in the image 400 of FIG. 4. The DDIC 320 may be configured to identify completion of the scan of the partial image 400-11 of the image 400 while the first processor 310 is in the sleep state. The DDIC 320 may be configured to transmit a signal (hereinafter, referred to as a timing signal) indicating the timing at which data is recorded in the internal memory 322 in response to the identification to the first processor 310 while the first processor 310 is in the sleep state. The timing signal may be periodically transmitted to the first processor 310 when the electronic device 300 operates in the normal mode, but may be aperiodically transmitted to the first processor 310 when the electronic device 300 operates in the AOD mode. For example, when the electronic device 300 operates in the AOD mode, the timing signal may be transmitted to the first processor 310 at a time point at which the partial image is completely scanned regardless of the period. The timing signal may include the TE signal.

The first processor 310 may be configured to generate the occurrence of an event indicating a change or an update of the first image in a time interval from the time point at which the first partial image is scanned to the time point at which the timing signal is received. The first processor 310 may be configured to detect reception of a message from another electronic device through the second processor 315 in the time interval. The first processor 310 may be configured to switch the state of the first processor 310 from the sleep state to the wake-up state based on the detection. The first processor 310 may be configured to generate or acquire the second image related to the first image based on the detection after switching to the wake-up state. The second image may include the plurality of second partial images. The plurality of second partial images may be associated or concatenated with each other in order to display animation through the display panel 330 while the electronic device 300 operates in the AOD mode as illustrated in the image 450 of FIG. 4. Each of the plurality of second partial images may be a partial image generated by inserting at least one visual object into each of the plurality of first partial images.

The first processor 310 may transmit information on the second image including the plurality of second partial images to the DDIC 320 based on the timing signal. The first processor 310 may transmit the information on the second image to the DDIC 320 at a timing at which the timing signal is received in order to prevent the tearing effect while the animation is provided through the plurality of second partial images. The first processor 310 may be configured to switch the state of the first processor 310 to the sleep state after transmitting the information on the second image to the DDIC 320.

The DDIC 320 may be configured to record or store the information on the second image in the internal memory 322. The DDIC 320 may be configured to scan the second partial image (for example, the partial image 450-12 of the image 450) corresponding to the scanned first partial image (e.g., the partial image 400-12 of the image 400 subsequent to (e.g., next to or after) the partial image 400-11 of the image 400 among the plurality of second partial images included in the second image while the first processor 310 is in the sleep state. The DDIC 320 may be configured to display the second partial image through the display panel 330 in response to the identification that the second partial image is completely scanned while the first processor 310 is in the sleep state. The DDIC 320 may be configured to transmit the timing signal to the first processor 310 in response to the identification that the second partial image is completely scanned while the first processor 310 is in the sleep state.

Figure 5:
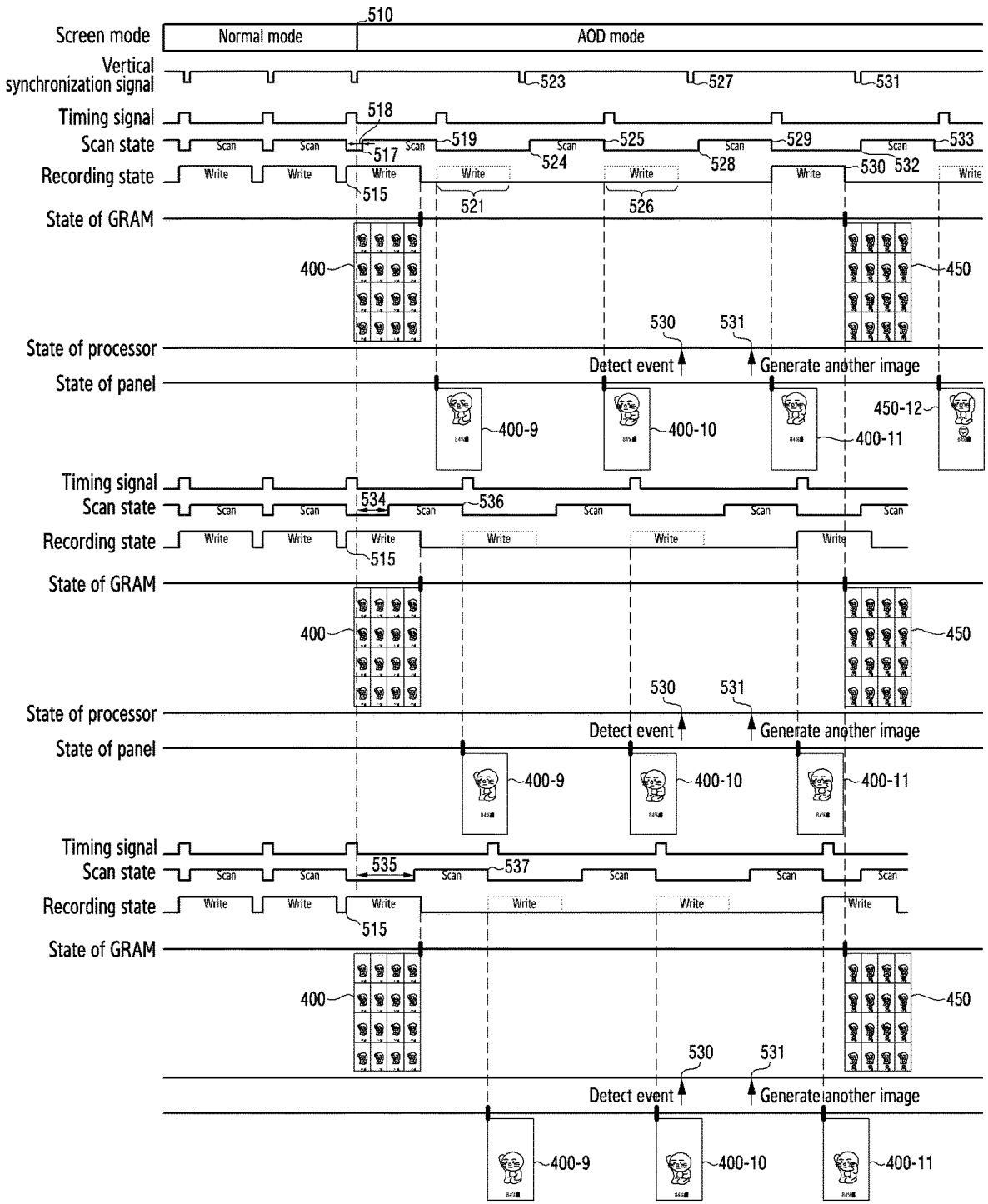
FIG. 5 illustrates an example of signals used by the electronic device, according to an embodiment.

FIG. 5 illustrates an example of signals used by the electronic device, according to an embodiment.

Referring to FIG. 5, the electronic device 300 may switch from the normal mode to the AOD mode at a time point 510. In the time interval before the time point 510, the DDIC 320 may display the screen through the display panel 330 based on a first frame rate (e.g., 60 Hz) set for the normal mode. In the time interval before the time point 510, the DDIC 320 may generate the vertical synchronization signal for controlling the display of the screen in every period corresponding to the first frame rate. The DDIC 320 may transmit the timing signal indicating the timing at which the first processor 310 stores data in the internal memory 322 to the first processor 310 based on a timing at which the vertical synchronization signal is generated in the time interval before the time point 510. Since the timing signal is transmitted based on the timing at which the vertical synchronization signal is generated in the time interval before the time point 510 in which the electronic device 300 provides the normal mode, the timing signal may be transmitted to the first processor 310 at the predetermined period. The DDIC 320 may display the screen through the display panel 330 based on a second frame rate (e.g., 30 Hz) set for the AOD mode based on switching to the AOD mode.

The first processor 310 may transmit information on the image 400 to be provided during the AOD mode at a time point 515 before the time point 510 to the DDIC 320 based on the determination that the driving mode is switched from the normal mode to the AOD mode. The DDIC 320 may receive the information on the image 400 from the first processor 310. The DDIC 320 may record or store the information on the image 400 in the internal memory 322.

The DDIC 320 may scan the partial image 400-9 among the partial images 400-1 to 400-16 included in the image 400 stored in the internal memory 322 at the time point 517. The DDIC 320 may scan the partial image 400-9 at the time point 517 delayed by a time interval 518 from the time point 510 at which the vertical synchronization signal is generated in order to display the partial image 400-9 in a top area of the display panel 330. The DDIC 320 may identify that the partial image 400-9 is completely scanned at a time point 519. The DDIC 320 may transmit the timing signal to the first processor 310 in response to the identification that the partial image 400-9 is completely scanned at the time point 519. The timing signal may be transmitted to the first processor 310 independently from the timing at which the vertical synchronization signal is generated, unlike the timing signal transmitted in the normal mode. The transmission of the timing signal in the AOD mode may be performed based on aperiodicity, unlike the timing signal in the normal mode performed based on periodicity. The DDIC 320 may display the partial image 400-9 in the top area of the display panel 330 based on the identification that the partial image 400-9 is completely scanned at the time point 519.

The first processor 310 may receive the timing signal at the time point 519. When the update or the change of the screen to be displayed in the AOD mode is not required, the first processor 310 may not record the image in the internal memory 322, like in the time interval 521.

The DDIC 320 may generate the vertical synchronization signal at the time point 523 based on a predetermined period identified based on the second frame rate. In order to provide animation in the AOD mode, the DDIC 320 may scan the partial image 400-10 subsequent to the partial image 400-9 at a time point 524 delayed by the time interval 517 from a time point 523. The DDIC 320 may identify that the partial image 400-10 is completely scanned at a time point 525. The DDIC 320 may transmit the timing signal to the first processor 310 at a time point 525 in response to the identification that the partial image 400-10 is completely scanned. The timing signal may be transmitted to the first processor 310 at a timing different from the timing at which the vertical synchronization signal is generated, unlike the timing signal transmitted in the normal mode. The DDIC 320 may display the partial image 400-10 in the top area of the display panel 330 based on the identification that the partial image 400-10 is completely scanned at the time point 525.

The first processor 310 may receive the timing signal at the time point 525. When the update or the change of the screen to be displayed in the AOD mode is not required, the first processor 310 may not record the image in the internal memory 322, like in the time interval 526.

The DDIC 320 may generate the vertical synchronization signal at a time point 527 based on the predetermined period identified based on the second frame rate. In order to provide animation in the AOD mode, the DDIC 320 may scan the partial image 400-11 subsequent to the partial image 400-10 at a time point 528 delayed by the time interval 517 from the time point 527. The DDIC 320 may identify that the partial image 400-11 is completely scanned. The DDIC 320 may transmit the timing signal to the first processor 310 at a time point 529 in response to the identification that the partial image 400-11 is completely scanned. The DDIC 320 may display the partial image 400-11 in the top area of the display panel 330 based on the identification that the partial image 400-11 is completely scanned at the time point 529.

The first processor 310 may receive the timing signal at the time point 529. The first processor 310 may detect an event indicating a change or an update of the first image at the time point 530 before the time point 529 while the electronic device 300 operates in the AOD mode. For example, the event may be reception of a message. The first processor 310 may generate the image 450 generated by changing the image 400 at a time point 531 before the time point 529 based on the detection of the event. Each of the partial images (e.g., the partial image 450-1 to the partial image 450-N) in the image 450 may be an image generated by adding a visual object indicating reception of the message to each of the partial images (e.g., the partial image 400-1 to the partial image 400-N) in the image 400 or inserting the visual object into each of the partial images.

The first processor 310 may record information on the image 450 in the internal memory 322 by transmitting the information on the image 450 including the partial images 450-1 to 450-N to the DDIC 320 at the time point 529 at which the timing signal is received. The first processor 310 may complete recording of the information on the image 450 at the time point 530. As illustrated in FIG. 5, the internal memory 322 may store the image 450 generated by changing the image 400 at the time point 530 as the result of recording.

The DDIC 320 may generate the vertical synchronization signal at a time point 531 based on the predetermined period identified based on the second frame rate. In order to provide animation in the AOD mode, the DDIC 320 may scan the partial image 450-12 corresponding to the partial image 400-12 subsequent to the partial image 400-11 at a time point 532 delayed by the time interval 517 from the time point 531. The DDIC 320 may identify that the partial image 450-12 is completely scanned at a time point 533. The DDIC 320 may transmit the timing signal to the first processor 310 at the time point 533 in response to the identification that the partial image 450-12 is completely scanned. The timing signal may be transmitted to the first processor 310 at a timing distinguished from the timing at which the vertical synchronization signal is generated, unlike the timing signal transmitted in the normal mode. The DDIC 320 may display the partial image 450-12 in the top area of the display panel 330 based on the identification that the partial image 450-12 is completely scanned at the time point 533.

When the partial images are displayed in a middle area of the display panel 330 or a bottom area of another display panel 330, the DDIC 320 and the first processor 310 may perform operations similar to the operations for displaying the partial images in the top area of the display panel 330. However, the DDIC 320 may scan each of the partial images at a time point delayed by a time interval 534 from the time point at which the vertical synchronization signal is generated when the partial images are displayed in the middle area of the display panel 330, and may scan each of the partial images at a time point delayed by a time interval 535 from the time point at which the vertical synchronization signal is generated when the partial images are displayed in the bottom area of the display panel 330.

The DDIC 320 may change the timing at which the timing signal is transmitted (or output) based on a change in the location at which the partial image is displayed. For example, when the location at which the partial image 400-9 is displayed is changed from the top area to the middle area, the DDIC 320 may change the time point at which the timing signal is transmitted to the first processor 310 from the time point 519 to a time point 536. Further, when the location at which the partial image 400-9 is displayed is changed from the top area to the bottom area, the DDIC 320 may change the time point at which the timing signal is transmitted to the first processor 310 from the time point 519 to a time point 537. Because the DDIC 320 transmits the timing signal at the time point at which the scan is completed, the DDIC 320 may change the time point at which the timing signal is transmitted if the location at which the partial image is displayed is changed.

As described above, the electronic device 300 may prevent the tearing effect in the AOD mode by controlling the transmission of the timing signal that the DDIC 320 provides to the first processor 310 based on the driving mode (for example, the normal mode or the AOD mode). Since the time required for scanning the partial image is shorter than the time required for scanning the full-frame image, the electronic device 300 may perform aperiodic transmission of the timing signal in the AOD mode.

The DDIC 320 may be configured to scan the first partial image among the plurality of first partial images included in the first image stored in the internal memory 322 while the first processor 310 is in the sleep state. The DDIC 320 may be configured to identify whether the first partial image corresponds to the partial image recorded in a predetermined area of the internal memory 322 while the first processor 310 is in the sleep state. The predetermined area may be configured to prevent data from being recorded in the internal memory 322 before a certain partial image of the plurality of first partial images is scanned. The predetermined area may correspond to an area including a location at which the first processor 310 starts recording the data within the entire area of the internal memory 322 provided to store the data. For example, the predetermined area may correspond to an area in which the partial image 400-1 to the partial image 400-4 included in the image 400 illustrated in FIG. 4 are stored. Further, the predetermined area may be an area in which the partial image 450-1 to the partial image 450-4 included in the image 450 illustrated in FIG. 4 are stored.

The DDIC 320 may be configured to transmit a timing signal, indicating the timing at which data is recorded in the internal memory 322, to the first processor 310 based on the identification that the first partial image corresponds to the partial image recorded in the predetermined area while the first processor 310 is in the sleep state. The DDIC 320 may be configured to limit the transmission of the timing signal to the first processor 310 based on the identification that the first partial image corresponds to the partial image recorded in another area of the internal memory 322, distinguished from the predetermined area, while the first processor 310 operates in the sleep state. The DDIC 320 may not provide the timing signal to the first processor 310 by masking the timing signal based on the identification that the first partial image corresponds to the partial image recorded in another area of the internal memory 322, distinguished from the predetermined area. For example, the DDIC 320 may be configured to limit the transmission of the timing signal to the first processor 310 by configuring the timing signal to be in a null state based on the identification that the first partial image corresponds to the partial image recorded in the other area of the internal memory 322 while the first processor 310 is in the sleep state.

Additionally or alternatively, the DDIC 320 may prevent the timing signal from being transmitted to the first processor 310 by switching the state of a path between the first processor 310 and the DDIC 320 (or the timing signal generator 323), established for the timing signal, from an active state to an inactive state based on the identification that the first partial image corresponds to the partial image recorded in the other area of the internal memory 322 while the first processor 310 is in the sleep state.

When the timing signal is received from the DDIC 320, the first processor 310 may be configured to transmit information on the second image to the DDIC 320 at the time point at which the timing signal is received. The DDIC 320 may receive the information on the second image and store the received information on the second image in the internal memory 322.

Figure 6:
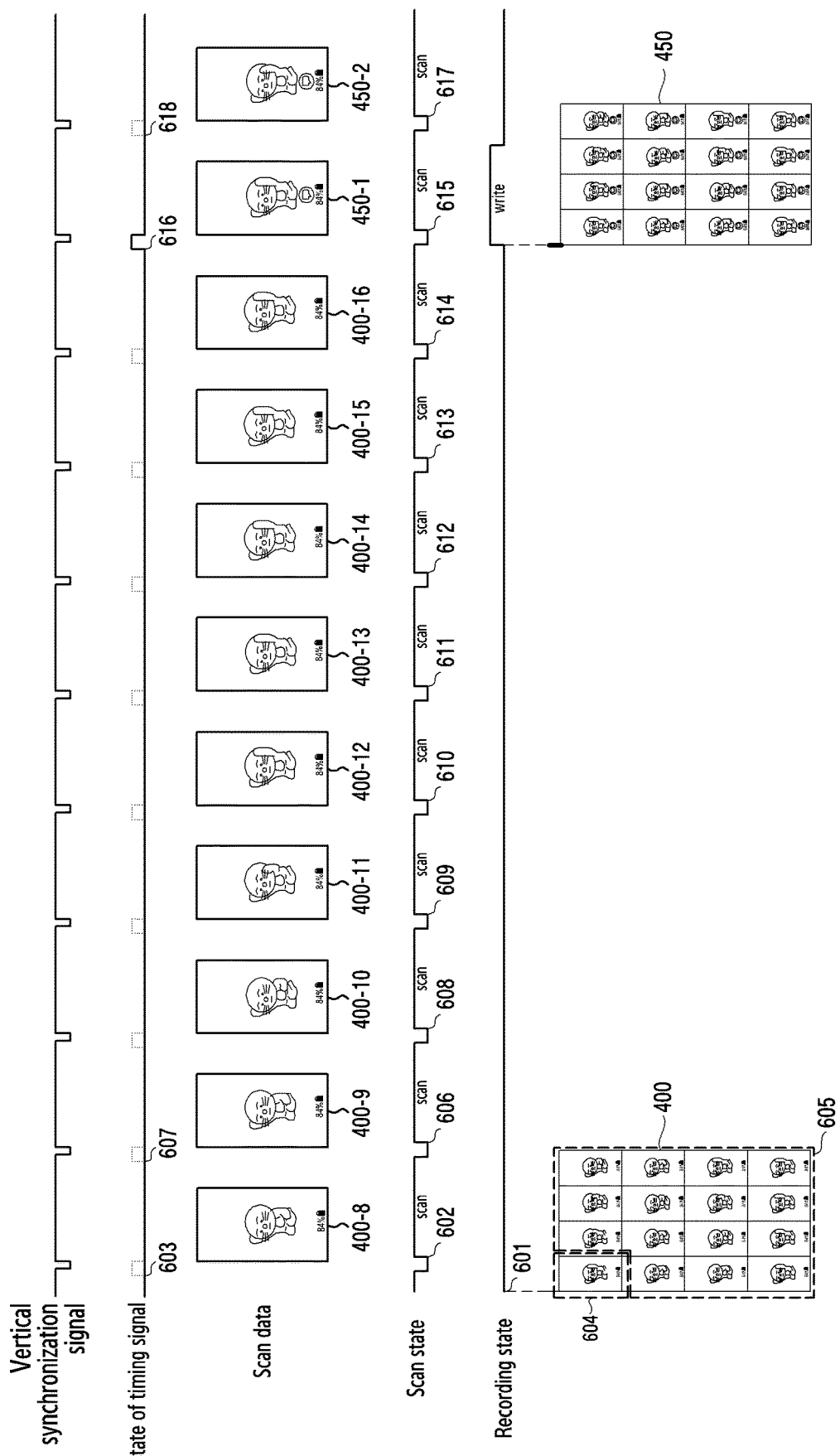
FIG. 6 illustrates an example of signals used by the electronic device, according to an embodiment.

FIG. 6 illustrates an example of signals used by the electronic device, according to an embodiment.

Referring to FIG. 6, the DDIC 320 may generate the vertical synchronization signal at a predetermined period identified based on the second frame rate while the electronic device 300 operates in the AOD mode. The DDIC 320 may generate the timing signal at the time point determined based on the time point at which the vertical synchronization signal is generated at the predetermined period. The internal memory 322 of the DDIC 320 may be in a state in which the image 400 of FIG. 4 is stored at a time point 601.

The DDIC 320 may scan the partial image 400-8 including the image 100 stored in the internal memory 322 at a time point 602 in order to display animation through the display panel 330 while the AOD mode is provided. The DDIC 320 may scan the partial image 400-8 at the time point 602 at which the vertical synchronization signal is generated. The DDIC 320 may identify whether the scanned partial image 400-8 corresponds to the partial image recorded in a predetermined area of the internal memory 322 in order to determine whether to transmit the timing signal to the first processor 310 at the time point 603 identified based on the time point at which the vertical synchronization signal is generated.

Since the partial image 400-8 corresponds to the partial image stored in another area 605, distinguished from the predetermined area 604 in the entire area set to store the data in the internal memory 322, the DDIC 320 may limit the transmission of the timing signal to the first processor 310 at the time point 603. For example, the DDIC 320 may limit the transmission of the timing signal to the first processor 310 at the time point 603 by configuring the timing signal to be in a null state.

Additionally or alternatively, the DDIC 320 may limit the transmission of the timing signal to the first processor 310 at the time point 603 by switching the state of the transmission path of the timing signal. Distinguishing between the area 604 and the area 605 may be determined depending on a data scan rate from the internal memory 322 or a data recording rate in the internal memory 322.

The DDIC 320 may scan the partial image 400-9 subsequent to the partial image 400-8 at a time point 606 at which the vertical synchronization signal is generated based on the predetermined period in order to display animation through the display panel 330 while the AOD mode is provided. The DDIC 320 may identify whether the partial image 400-9 corresponds to the partial image recorded in the predetermined area of the internal memory 322 in order to determine whether to transmit the timing signal to the first processor 310 at the time point 606. Since the partial image 400-9 corresponds to the partial image stored in the other area 605, different from the area 604, the DDIC 320 may limit the transmission of the timing signal at a time point 607 identified based on the time point at which the vertical synchronization signal is generated.

The DDIC 320 may scan the partial image 400-10 to the partial image 400-16 at a time point 608 to a time point 614 at which the vertical synchronization signal is generated based on the predetermined period, similar to the operation at the time point 602 to the time point 606. Since each of the partial image 400-10 to the partial image 400-16 corresponds to the partial image stored in the area 605, different from the area 604, the DDIC 320 may limit the transmission of the timing signal to the first processor 310, similar to the operation at the time point 603 and the time point 607.

The DDIC 320 may transmit the timing signal to the first processor 310 at a time point 616, identified based on the time point 615 at which the vertical synchronization signal is generated. Since the image to be scanned at the time point 615 corresponds to the partial image 400-1 included in the area 604, the DDIC 320 may transmit the timing signal to the first processor 310 without limiting transmission of the timing signal. The first processor 310 may transmit information on the image 450 to the DDIC 320 at the time point 616 at which the timing signal is received. The first processor 310 or the second processor 315 may detect an event (e.g., a battery level change or message reception) indicating a change of an image to be stored or recorded in the internal memory within a time interval between the time point 603 and the time point 616. The first processor 310 or the second processor 315 may generate the image 450 based on the detection. The first processor 310 or the second processor 315 may transmit information on the image 450 to the DDIC 320 at the time point 615. The DDIC 320 may store or record the information on the image 450 in the internal memory 322 at the time point 615. The image 450 may include the partial images 450-1 to 450-16, corresponding respectively to the partial images 400-1 to 400-16. Each of the partial images 450-1 to 450-16 may be a partial image generated by inserting a visual object (that is, at least one visual object related to an event) indicating reception of a message into each of the partial images 400-1 to 400-16. The DDIC 320 may scan the partial image 450-1 included in an area corresponding to the area in which the partial image 400-1 is stored at the time point 615 in order to display animation through the display panel 330 while the AOD mode is provided. Since the time point 616 at which the image 450 is recorded is earlier than the time point 615 at which the partial image 450-1 among the partial images 450-1 to 450-16 is scanned, the electronic device 300 may prevent the tearing effect.

When the first processor 310 or the second processor 315 does not detect the event within the time interval between the time point 603 and the time point 616, the first processor 310 or the second processor 315 may not transmit information on the image 450 to the DDIC 320. For example, transmission of the timing signal at the time point 616 may be independent from the detection of the event. When it is identified that a change of the image 400 stored in the internal memory 322 is not required, the first processor 310 or the second processor 315 may not record data in the internal memory 322 even though the timing signal is received from the DDIC 320.

In order to display animation through the display panel 330 while the AOD mode is provided, the DDIC 320 may scan the partial image 450-2 at a time point 617 at which the vertical synchronization signal is generated. The DDIC 320 may identify whether the partial image 450-2 corresponds to the partial image recorded in the predetermined area 604 of the internal memory 322. Since the partial image 450-2 corresponds to the partial image stored in the area 605, different from the predetermined area 604, the DDIC 320 may limit the transmission of the timing signal to the first processor 310 at a time point 618, identified based on the time point 617 at which the vertical synchronization signal is generated.

As described above, the electronic device 300 may prevent the tearing effect while the animation is provided in the AOD mode by transmitting the timing signal only at the time point at which at least one partial image included in the predetermined area within the entire area of the internal memory 322 is scanned and limiting transmission of the timing signal to the first processor 310 at the time point at which at least one partial image included in another area, different from the predetermined area within the entire area, is scanned.

The DDIC 320 may be configured to receive data from the first processor 310 and start storing the data in an area corresponding to a first address before a scan start address among a plurality of addresses set in the internal memory 322. For example, when the DDIC 320 scans or will scan the partial image 400-10 among the partial images 400-1 to 400-16 within the image 400 stored in the internal memory 322, the DDIC 320 may be configured to start storing information on the image 450 in an area corresponding to a first address before a scan start address of the partial image 400-10. The distance between the start address and the first address may be configured such that the speed at which new data is recorded in the internal memory 322 cannot be faster than the speed at which the data stored in the internal memory 322 is scanned. For example, the distance between the start address and the first address may correspond to the length of a vertical porch of the vertical synchronization signal generated within the DDIC 320.

When the scan is performed in the last address among the plurality of addresses, the DDIC 320 may be configured to perform the scan from the first address among the plurality of addresses. When other data is received from the first processor 310, the DDIC 320 may be configured to start storing the other data in an area corresponding to a second address, subsequent to the last address of the area in which the data is stored.

Figure 7:
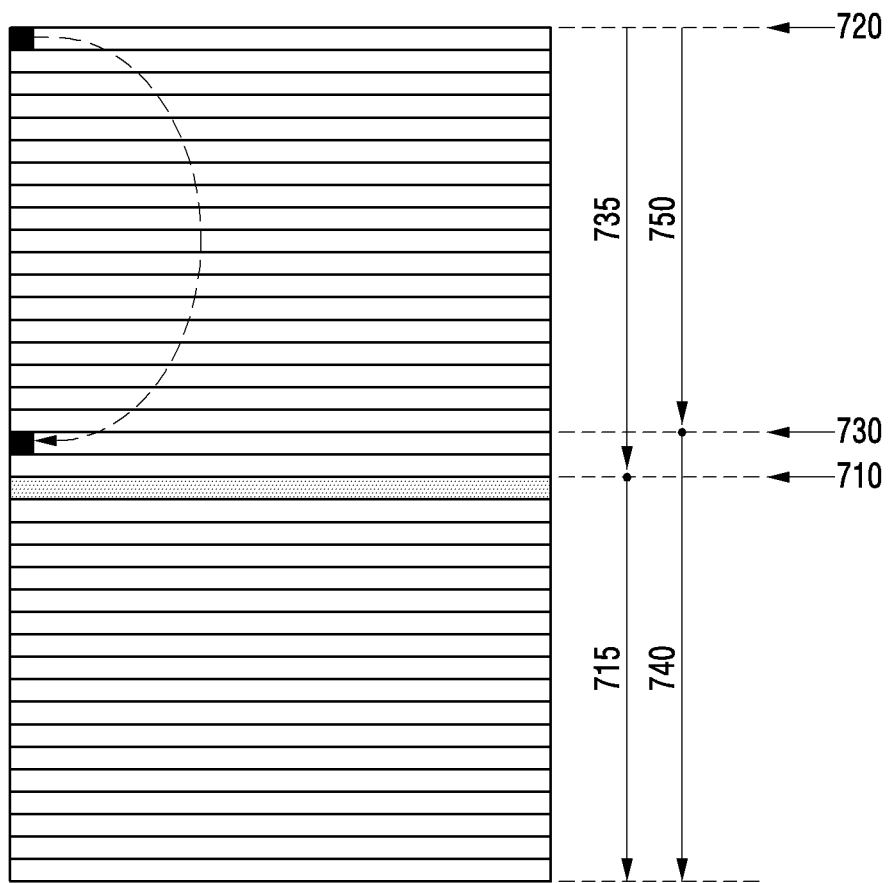
FIG. 7 illustrates a state of an internal memory within the electronic device, according to an embodiment.

FIG. 7 illustrates a state of an internal memory within the electronic device, according to an embodiment.

Referring to FIG. 7, in order to provide animation in the AOD mode, the DDIC 320 may perform the scan from an address 710 among the plurality of addresses set in the internal memory 322. The DDIC 320 may perform the scan from the address 710 along a timeline 715. The DDIC 320 may store data provided from the first processor 310 in the internal memory 322. In order to prevent the tearing effect while animation is provided in the AOD mode, the DDIC 320 may start storing the data in an address 730 before the address 710 rather than the first address 720 among the plurality of addresses set in the internal memory 322. The address 730 may be selected as an address at which the data recording speed cannot be faster the data scan speed among the plurality of addresses. The DDIC 320 may store the data in the internal memory 322 from the address 730 along a timeline 740.

The DDIC 320 may perform the scan from the start address 720 along a timeline 735 after performing the scan from the address 710 along the timeline 715. After performing recording (writing) from the address 730 along the timeline 740, the DDIC 320 may perform recording from the address 720 along the timeline 750.

As described above, the electronic device 300 may prevent the tearing effect while animation is provided in the AOD mode by performing recording from an address a predetermined distance ahead of the scan start address rather than performing recording from the start address among the plurality of addresses set in the internal memory 322.

The DDIC 320 may further include another memory, different from the internal memory 322, in order to prevent the tearing effect. For example, the other memory may be referred to as a dummy RAM. The capacity of the other memory may be configured such that the data recording speed cannot be faster than the data scan speed. For example, the capacity of the other memory may correspond to the length of the vertical porch interval of the vertical synchronization signal generated by the DDIC 320.

The DDIC 320 may be configured to perform the scan from a first start address among a plurality of first addresses set in the internal memory 322. The DDIC 320 may be configured to perform the scan from a second start address among a plurality of second addresses set in the other memory after performing the scan in the last address among the plurality of first and second addresses. The DDIC 320 may be configured to perform the scan from the first start address after performing the scan in the last address among the plurality of second addresses. The DDIC 320 may be configured to perform the recording from the second start address rather than the first start address among the plurality of first addresses. The DDIC 320 may be configured to perform the recording from the first start address among the plurality of first addresses after performing the recording from the last address among the plurality of second addresses. The electronic device 300 may prevent the tearing effect generated in the electronic device 300 by configuring the address at which the recording starts (for example, the second start address) to be different from the address at which the scan starts (for example, the first start address). The electronic device 300 may prevent the tearing effect while animation is provided in the AOD mode by configuring the address at which the recording starts to be different from the address at which the scan starts.

Figure 8:
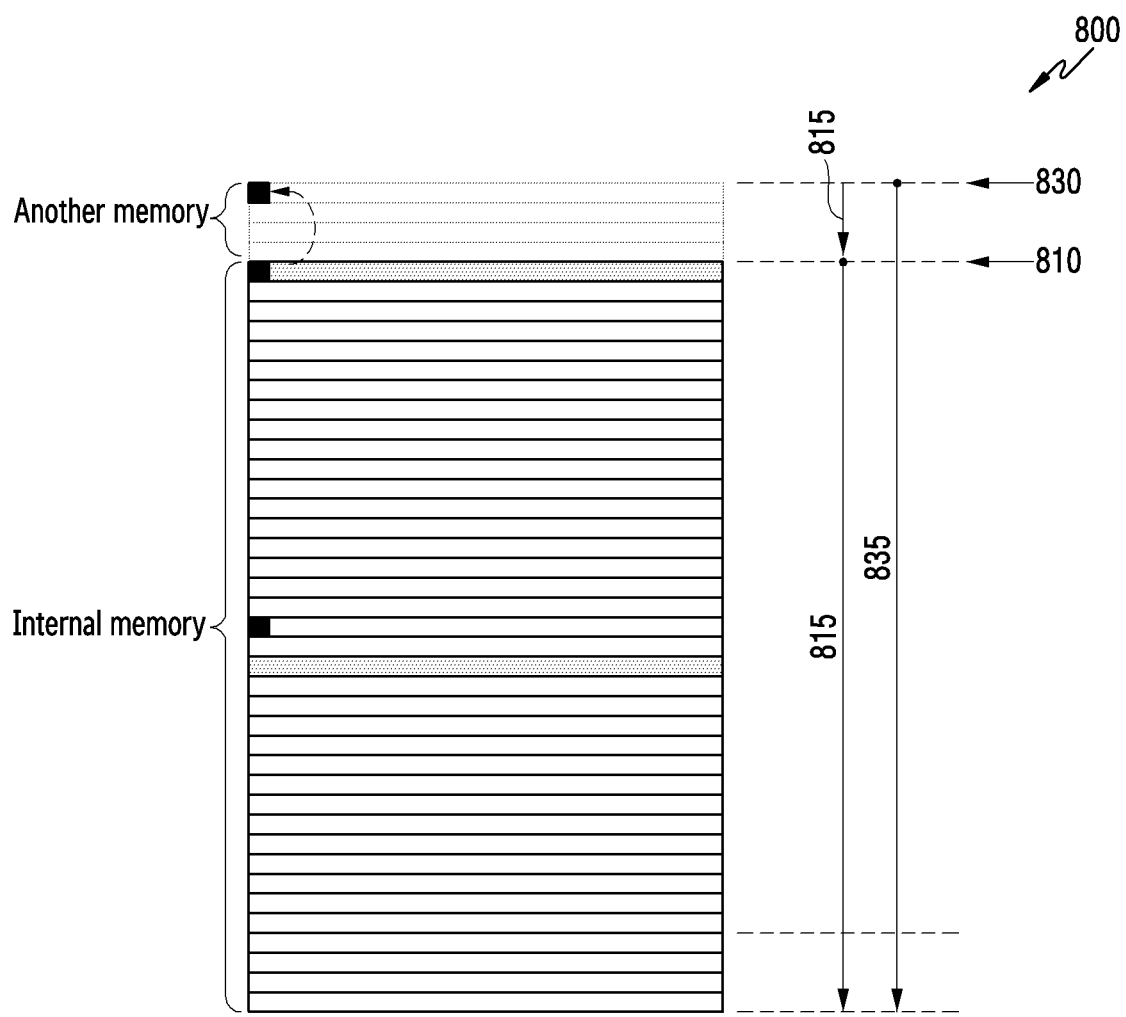
FIG. 8 illustrates a state of an internal memory and another memory within the electronic device, according to an embodiment.

FIG. 8 illustrates a state of an internal memory and another memory within the electronic device, according to an embodiment.

Referring to FIG. 8, the DDIC 320 may perform the scan from a start address 810 among a plurality of first addresses set in the internal memory 322 and along a timeline 815. The DDIC 320 may perform the recording from a start address 830 among a plurality of second addresses set in the other memory rather than the start address 810. The DDIC 320 may perform the scan from the start address 830 along a timeline 835. Since the scan start address 810 and the recording start address 830 are different from each other, the electronic device 300 may prevent the tearing effect that is generated when the data recording speed is faster than the data scan speed. The electronic device 300 may prevent the tearing effect while the animation is provided in the AOD mode by configuring the location at which the data recording in the internal memory 322 starts, such that the location at which the data recording in the internal memory 322 starts is set to be an address in another memory, different from the internal memory 322. Since the electronic device 300 distinguishes between the address at which the data scan starts and the address at which the data recording starts, the electronic device 300 may not request the generation of the timing signal. Because the electronic device 300 does not generate the timing signal, the amount of calculations required for generating the timing signal is reduced.

In order to display animation in the AOD mode, the first processor 310 may be configured to divide the first image (or the second image) into N partitioned images. The N partitioned images may be different from the plurality of first partial images (or the plurality of second partial images). For example, referring to FIG. 4, when the plurality of first partial images are the partial images 400-1 to 400-16, the N partitioned images may be a first partitioned image including the partial images 400-1 to 400-4, a second partitioned image including the partial images 400-5 to 400-8, a third partitioned image including the partial images 400-9 to 400-12, and a fourth partitioned image including the partial images 400-13 to 400-16. For example, the first processor 310 may be configured to generate the N partial images by partitioning the first image (or the second image) in a horizontal direction N−1 times while the electronic device 300 operates in the AOD mode.

The DDIC 320 may be configured to generate the vertical synchronization signal at the predetermined period. The DDIC 320 may be configured to transmit the timing signal to the first processor 310 at a time point identified based on the time point at which the vertical synchronization signal is generated. In other words, the DDIC 320 may be configured to transmit the timing signal to the first processor 310 at the predetermined period.

The first processor 310 may be configured to receive the timing signal from the DDIC 320 at the predetermined period. The first processor 310 may be configured to record information on the N partitioned images in the internal memory 322 by sequentially transmitting the information on the N partitioned images to the DDIC 320 whenever the timing signal is received. For example, the first processor 310 may be configured to transmit the first partitioned image in response to reception of the timing signal, transmit the second partitioned image in response to reception of the timing signal after transmitting first partitioned image, transmit the third partitioned image in response to reception of the timing signal after transmitting the second partitioned image, and transmit the fourth partitioned image in response to reception of the timing signal after transmitting the third partitioned image. Since the first processor 310 acquires the plurality of partitioned images by partitioning the first image in a horizontal direction and sequentially transmits the plurality of partitioned images to the DDIC 320 at the predetermined period, the tearing effect can be prevented even though the DDIC 320 scans a certain partial image among the plurality of first partial images included in the first image.

Figure 9:
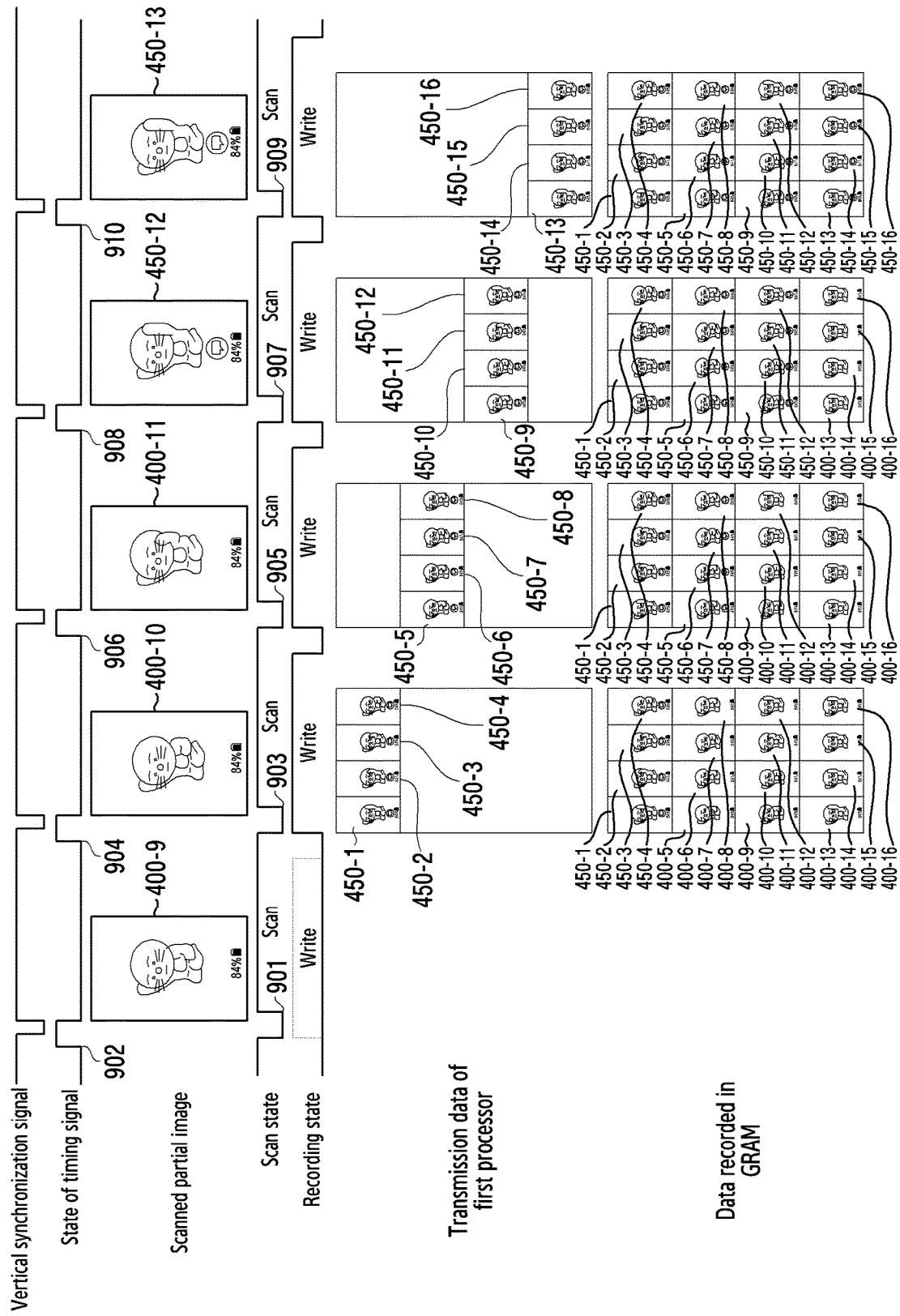
FIG. 9 illustrates an example of signals used by the electronic device, according to an embodiment.

FIG. 9 illustrates an example of signals used by the electronic device, according to an embodiment.

Referring to FIG. 9, in order to provide animation in the AOD mode, the DDIC 320 may sequentially scan the partial images 400-1 to 400-16 included in the image 400 stored in the internal memory 322 whenever the vertical synchronization signal is transmitted at the predetermined period. For example, the DDIC 320 may scan the partial image 400-9 among the partial images 400-1 to 400-16 at a time point 901. The DDIC 320 may display the partial image 400-9 through the display panel 330 based on the scan.

The DDIC 320 may transmit the timing signal to the first processor 310 at every time point identified based on the time point at which the vertical synchronization signal is periodically transmitted (or generated). For example, the DDIC 320 may transmit the timing signal to the first processor 310 at a time point 902. The first processor 310 may receive the timing signal at the time point 902. The first processor 310 receiving the timing signal at the time point 902 may not record new data in the internal memory 322 as a result of identifying that the change of the image 400 stored in the internal memory 322 is not required.

The DDIC 320 may scan the partial image 400-10 subsequent to the partial image 400-9 in order to provide the images in the AOD mode as animation type images (for example, in order to display the plurality of images in a predetermined order). The DDIC 320 may transmit the timing signal to the first processor 310 at a time point 904. The first processor 310 may receive the timing signal at the time point 904 and store information on the first partitioned image in the internal memory 322 by transmitting the information on the first partitioned image, which is acquired by partitioning the image 450 and includes the partial images 450-1 to 450-4, to the DDIC 320 at the time point 904. Since an area in which the first partitioned image is stored is located after the area in which the partial image 400-10 is scanned, the electronic device 300 may prevent the tearing effect while the animation is provided in the AOD mode. The DDIC 320 may display the partial image 400-10 through the display panel 330 based on the scan.

In order to provide the animation in the AOD mode, the DDIC 320 may scan the partial image 400-11 subsequent to the partial image 400-10 at a time point 905. The DDIC 320 may transmit the timing signal to the first processor 310 at a time point 906. The first processor 310 may receive the timing signal at the time point 906. The first processor 310 may store information on the second partitioned image in the internal memory 322 by transmitting the information on the second partitioned image including the partial images 450-5 to 450-8 among the images partitioned from the image 450 to the DDIC 320 at a time point 906. Since the area in which the second partitioned image is stored is located after the area in which the partial image 400-11 is scanned, the electronic device 300 may prevent the tearing effect while the animation is provided in the AOD mode. The DDIC 320 may display the partial image 400-11 through the display panel 330 based on the scan.

The DDIC 320 may scan the partial image subsequent to the partial image 400-11 in order to provide animation in the AOD mode. The DDIC 320 may transmit the timing signal to the first processor 310 at a time point 908. The first processor 310 may receive the timing signal at the time point 908. The first processor 310 may store information on the third partitioned image in the internal memory 322 by transmitting the information on the third partitioned image including the partial images 450-9 to 450-12 among the images partitioned from the image 450 at the time point 908. Since the area in which the third partitioned image is stored includes a part of the area in which the scan is performed at the time point 907 but the delay between the scan and the storage is less than one horizontal line, the electronic device 300 may prevent the tearing effect while the animation is provided in the AOD mode. The DDIC 320 may display the partial image 450-12 through the display panel 330 based on the scan.

In order to provide the animation in the AOD mode, the DDIC 320 may scan the partial image 450-13 subsequent to the partial image 450-12 at a time point 909. The DDIC 320 may transmit the timing signal to the first processor 310 at a time point 910. The first processor 310 may receive the timing signal at the time point 910. The first processor 310 may store information on the fourth partitioned image in the internal memory 322 by transmitting the information on the fourth partitioned image including the partial images 450-13 to 450-16 among the partitioned images partitioned from the image 450 at the time point 910. Since the DDIC 320 scans the partial image 450-13 at the time point 909 after recording the partial image 450-13, the electronic device 300 may prevent the tearing effect while the animation is provided in the AOD mode. The DDIC 320 may display the partial image 450-13 through the display panel 330 based on the scan.

As described above, the electronic device 300 may prevent the tearing effect by partitioning the image to be displayed in the AOD mode in order to acquire a plurality of partitioned images and sequentially transmitting the acquired partitioned images based on a predetermined period.

An electronic device may include a display panel; a processor; and DDIC configured to control the display panel and comprising an internal memory, wherein the DDIC is configured to receive, while the processor operates in an active state, from the processor, a first content including a plurality of images to be displayed based on a specified order through the display panel while the processor operates in a low-power state; store the first content in the internal memory; change a timing for outputting a signal corresponding to a state capable of receiving a second content based on a change of a location in which an image among the plurality of images is displayed through the display panel while the processor operates in the low-power state; and output the signal to the processor based on the changed timing.

The signal may include a signal for requesting to write a content and the DDIC may be further configured to store the second content transmitted from the processor in the internal memory based on receiving the signal in the processor.

The second content may be a content in which at least a portion of the first content is changed.

The DDIC may be configured to if displaying the image in a second location changed from a first location in the display panel, change the timing for outputting the signal to a first timing; and if displaying the image in a third location changed from the first location in the display panel, change the timing for outputting the signal to a second timing distinct from the first timing.

The DDIC may be configured to change another timing for scanning data regarding the image based on the change of the location in which the image is displayed through the display panel; change the timing for outputting the signal based on the changed another timing; and output the signal to the processor based on the changed timing for outputting the signal.

The DDIC may be configured to change the timing for outputting the signal to a timing at which the scanning initiated based on the changed another timing is completed; and output the signal to the processor based on the timing changed to the timing at which the scanning is completed.

The electronic device may include a display panel; DDIC, comprising an internal memory, operably coupled to the display panel; and a processor operably coupled to the DDIC, wherein the DDIC is configured to scan, while the processor is in a sleep state, a first partial image among a plurality of first partial images included in a first image stored in the internal memory; identify that a scan of the first partial image is completed while the processor is in the sleep state; and transmit a signal associated with a timing that writes data in the GRAM to the processor while the processor is in the sleep state in response to the identification.

The plurality of first partial images may be associated with each other such that an animation is displayed through the display panel while the processor is in the sleep state.

The DDIC may be further configured to display the first partial image through the display panel based on the scan while the processor is in the sleep state.

The DDIC may be configured to scan the first partial image among the plurality of first partial images included in the first image based on a timing indicated by a vertical synchronization signal generated in the DDIC while the processor is in the sleep state.

The DDIC may be configured to transmit the signal to the processor based on a specified period while the processor operates in a wake-up state.

The processor may be configured to transmit a second image including a plurality of second partial images to the DDIC based on receiving the signal from the DDIC; and switch a state of the processor from a wake-up state to the sleep state based on the transmission, wherein each of the plurality of second partial images corresponds to a partial image inserting at least one visual object into each of the plurality of first partial images, and wherein the DDIC is further configured to write the second image in the internal memory; scan a second partial image corresponding to a partial image subsequent to the first partial image among the plurality of second partial images while the processor is in the sleep state; and display, while the processor is in the sleep state, the second partial image through the display panel in response to identifying that a scan of the second partial image is completed.

The DDIC may be further configured to transmit the signal to the processor while the processor is in the sleep state in response to identifying that the scan of the second partial image is completed.

The signal may include a TE signal.

The electronic device may include a display panel; DDIC, comprising an internal memory, operably coupled to the display panel; and a processor operably coupled to the DDIC, wherein the DDIC is configured to scan, while the processor is in a sleep state, a first partial image among a plurality of partial images included in an image written in the internal memory; identify whether the first partial image corresponds to a partial image written in a designated area of the internal memory while the processor is in the sleep state; and transmit, while the processor is in the sleep state, a signal for indicating a timing that writes data in the internal memory to the processor based on identifying that the first partial image corresponds to the partial image written in the designated area of the internal memory.

The DDIC may be further configured to while the processor is in the sleep state, restrict transmitting the signal to the processor based on identifying that the first partial image corresponds to a partial image written in another area of the internal memory distinct from the designated area.

The DDIC may be configured to, while the processor is in the sleep state, restrict transmitting the signal to the processor by configuring the signal as a null state based on identifying that the first partial image corresponds to the partial image written in the another area of the internal memory while the processor is in the sleep state.

The DDIC may be configured to restrict transmitting the signal to the processor by switching a state of a path between the processor and the DDIC associated with the signal from an active state to an inactive state based on identifying that the first partial image corresponds to the partial image written in the another area of the internal memory.

The designated area may correspond to an area including a location initiating writing within an entire area of the internal memory.

The processor may be configured to transmit another image to the DDIC based on receiving the signal from the DDIC; and switch a state of the processor from a wake-up state to the sleep state based on the transmission.

The DDIC may be further configured to transmit the signal to the processor based on a specified period while the processor operates in a wake-up state.

The DDIC may be further configured to display the first partial image through the display panel based on the scan.

The electronic device may include a display panel; DDIC comprising an internal memory; and a processor operably coupled to the DDIC, wherein the DDIC is configured to receive a data set from the processor; and initiate storing the data set in an area corresponding to a first address which is before an initial address among a plurality of addresses configured in the internal memory.

A distance between the first address and the initial address corresponds to a length of a vertical porch of a vertical synchronization signal generated in the DDIC.

The DDIC may be further configured to, if performing a scan at a last address among the plurality of addresses, perform a scan from the initial address among the plurality of addresses; receive another data set from the processor; and initiate storing the another data set in an area corresponding to a second address which is after a last address of an area in which the data set is stored.

The DDIC may be configured to receive the data set from the processor while the electronic device operates in an AOD mode; and while the electronic device operates in the AOD mode, initiate storing the data set in an area corresponding to the first address which is before the initial address among the plurality of addresses configured in the internal memory.

Figure 10A:
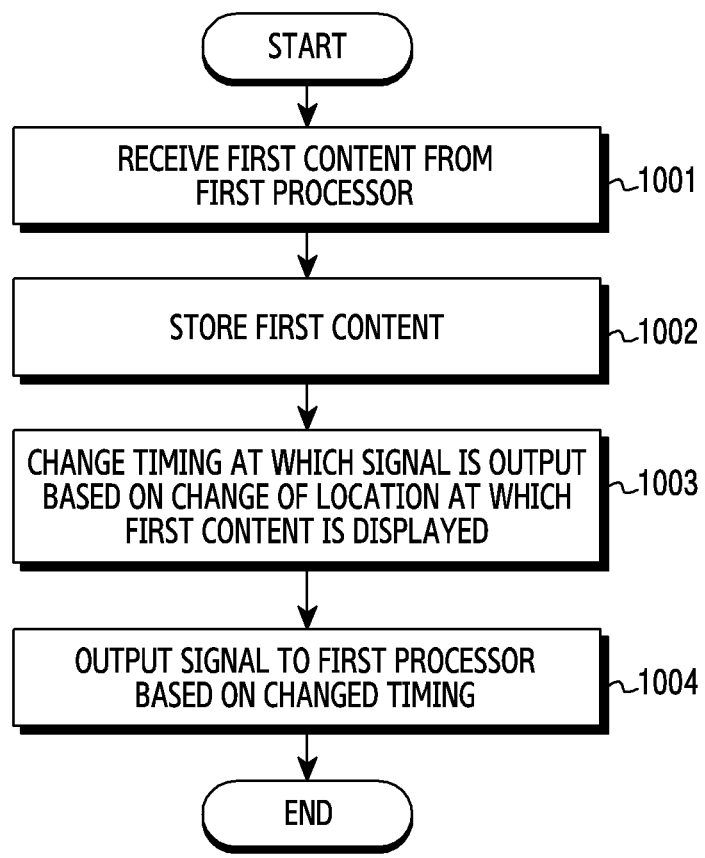
FIG. 10A illustrates a flowchart of the operation of the electronic device, according to an embodiment.

FIG. 10A illustrates a flowchart of the operation of an electronic device, according to an embodiment. The operation may be performed by the electronic device 101 illustrated in FIG. 1, the electronic device 300 illustrated in FIG. 3, the display driver IC 230 illustrated in FIG. 2, or the DDIC 320 illustrated in FIG. 3.

Referring to FIG. 10A, in step 1001, the DDIC 320 receives first content from the first processor 310. The DDIC 320 may receive the first content from the first processor 310 operating in an active state. The first processor 310 may switch to a low-power state (or a sleep state) after transmitting the first content. The first content may include a plurality of images. The plurality of images may be associated or concatenated with each other in order to provide animation. For example, the plurality of images may be sequentially displayed through the display panel 330 in order to provide animation.

In step 1002, the DDIC 320 stores information on the first content in the internal memory 322. The DDIC 320 may store information on the first content in the internal memory 322 while the first processor 310 operates in the low-power state.

In step 1003, the DDIC 320 changes the timing at which a signal corresponding to a state in which second content can be received is output to the internal memory based on a change of a location at which one of the plurality of images is displayed through the display panel 330. The signal may be used to make a request for recording the second content in the internal memory 322. For example, when an event is detected before (such as immediately before) the signal is received, the first processor 310 may transmit information on the second content changed from the first content in response to reception of the signal.

The change of the location at which the one image is displayed may be identified by the DDIC 320 based on information provided from the first processor 310. For example, in order to prevent a burn-in phenomenon (such as when pixels do not return to their intended, or relaxed, state) according to the AOD mode, the first processor 310 may identify the change of the location at which the one image is displayed. The first processor 310 may transmit control information for changing the location at which the one image is displayed to the DDIC 320 based on the identification. The control information may include data indicating a start location at which the one image is displayed. The DDIC 320 may identify the change of the location at which the one image is displayed based on the control information.

The change of the location at which the one image is displayed may be identified by the DDIC 320. For example, in order to prevent the burn-in phenomenon according to the AOD mode, the DDIC 320 may identify the change of the location at which the one image is displayed based on a clock signal generated within the DDIC 320.

The DDIC 320 may change the timing at which the one image stored in the internal memory 322 is scanned based on the identification. For example, as illustrated in FIG. 5, when the one image is displayed in a top area of the display panel 330, the DDIC 320 may delay the timing at which the one image is scanned by the time interval 517. When the one image is displayed in a middle area changed from the top area, the DDIC 320 may delay the timing at which the one image is scanned by the time interval 534. When the one image is displayed in a bottom area changed from the middle area, the DDIC 320 may delay the timing at which the one image is scanned by the time interval 535. The DDIC 320 may change the timing at which the signal is output based on the change of the timing at which the one image is scanned. For example, the DDIC 320 may change the timing at which the signal is output based on the timing at which the one image is completely scanned. In other words, the DDIC 320 may change the timing at which the signal is output to a first timing when the one image is displayed at a second location changed from a first location within the display panel 330 and change the timing at which the signal is output to a second timing, different from the first timing, when the one image is displayed at a third location changed from the first location within the display panel 330.

In step 1004, the DDIC 320 may output the signal to the first processor 310 based on the changed timing. The first processor 310 may acquire the signal from the DDIC 320. The first processor 310 may transmit the second content to the DDIC 320 in response to the acquisition of the signal. The second content may be stored in the internal memory 322. The second content may correspond to content generated by changing at least a part of the first content. For example, each of a plurality of images included in the second content may further include at least one visual object, relative to each of the plurality of images included in the first content, or may include at least one other visual object, different from the at least one visual object included in each of the plurality of images included in the first content.

As described above, the DDIC 320 of the electronic device 300 may prevent the tearing effect generated in the electronic device 300 by changing the transmission timing at which the timing signal (for example, the TE signal) is provided to the first processor 310 based on the change of the location at which at least a part of the plurality of images included in the content is displayed. By preventing the tearing effect, the electronic device 300 may display animation using the content including the plurality of images during the AOD mode.

Figure 10B:
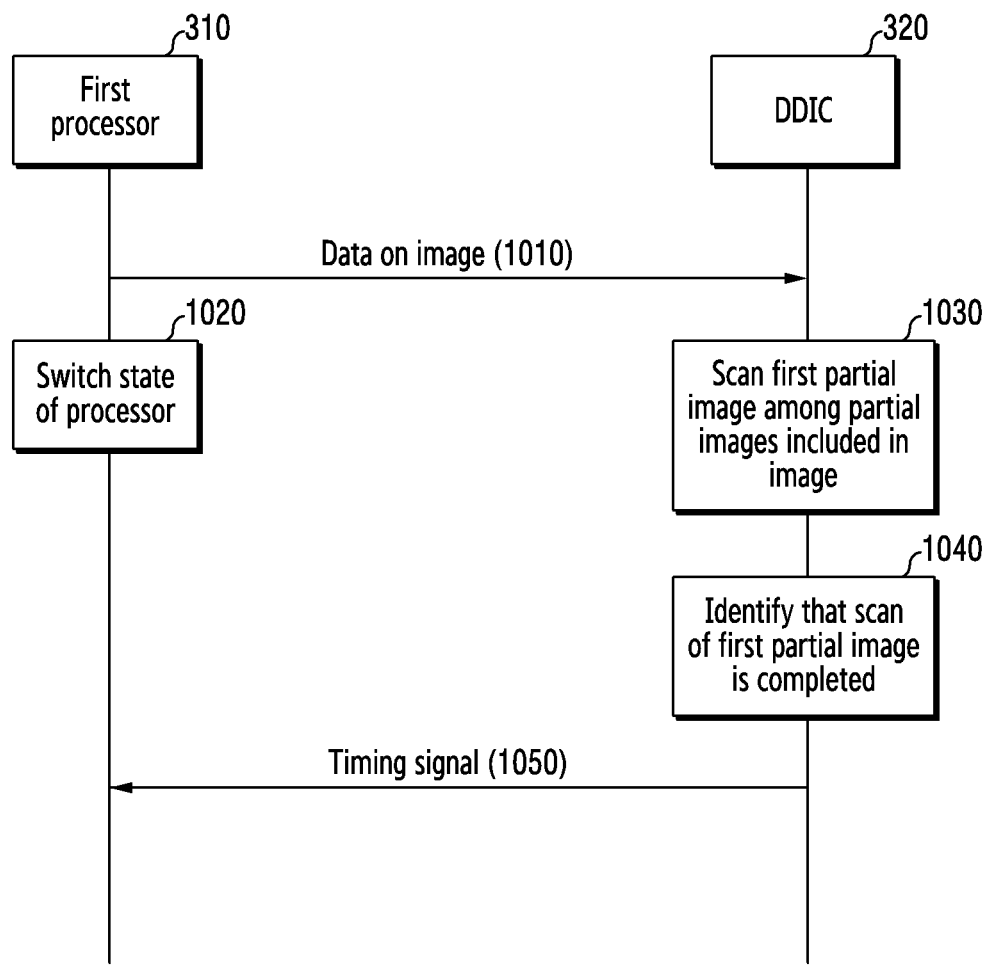
FIG. 10B illustrates a flowchart of the operation of the electronic device, according to an embodiment.

FIG. 10B illustrates a flowchart of the operation of the electronic device, according to an embodiment. The operation may be performed by the electronic device 101 illustrated in FIG. 1 or the electronic device 300 illustrated in FIG. 3.

Referring to FIG. 10B, in step 1010, the first processor 310 transmits data on the image to the DDIC 320. For example, the first processor 310 may transmit the data on the image to be displayed in order to provide the animation in the AOD mode to the DDIC 320. The first processor 310 may transmit the data on the image to the DDIC 320 in response to the identification of switching to the AOD mode. The image may include a plurality of partial images. The plurality of partial images may be associated or concatenated with each other in order to provide the animation in the AOD mode. The DDIC 320 may receive the data on the image. The DDIC 320 may store the data on the image in the internal memory 322.

After transmitting the data on the image, the first processor 310 switches the state of the first processor 310 to the sleep state in step 1020. The first processor 310 may be switched to the sleep state in order to reduce power consumed for displaying the screen.

In step 1030, the DDIC 320 scans a first partial image among the partial images included in the image stored in the internal memory 322. For example, the DDIC 320 may scan the first partial image among the partial images in order to provide the animation in the AOD mode.

In step 1040, the DDIC 320 identifies that the first partial image is completely scanned. For example, the DDIC 320 may monitor whether the first partial image is completely scanned in order to identify the time point at which the timing signal is transmitted to the first processor 310. The DDIC 320 may identify that the first partial image is completely scanned through the monitoring.

In step 1050, the DDIC 320 transmits the timing signal to the first processor 310 in response to the identification that the first partial image is completely scanned. The DDIC 320 may transmit the timing signal whenever the partial image is completely scanned in the AOD mode, unlike the normal mode, in which the timing signal is transmitted to the first processor 310 at the predetermined period. For example, the DDIC 320 may aperiodically transmit the timing signal. The electronic device 300 may prevent the tearing effect even though animation is provided in the AOD mode based on the aperiodic transmission of the timing signal.

Figure 11:
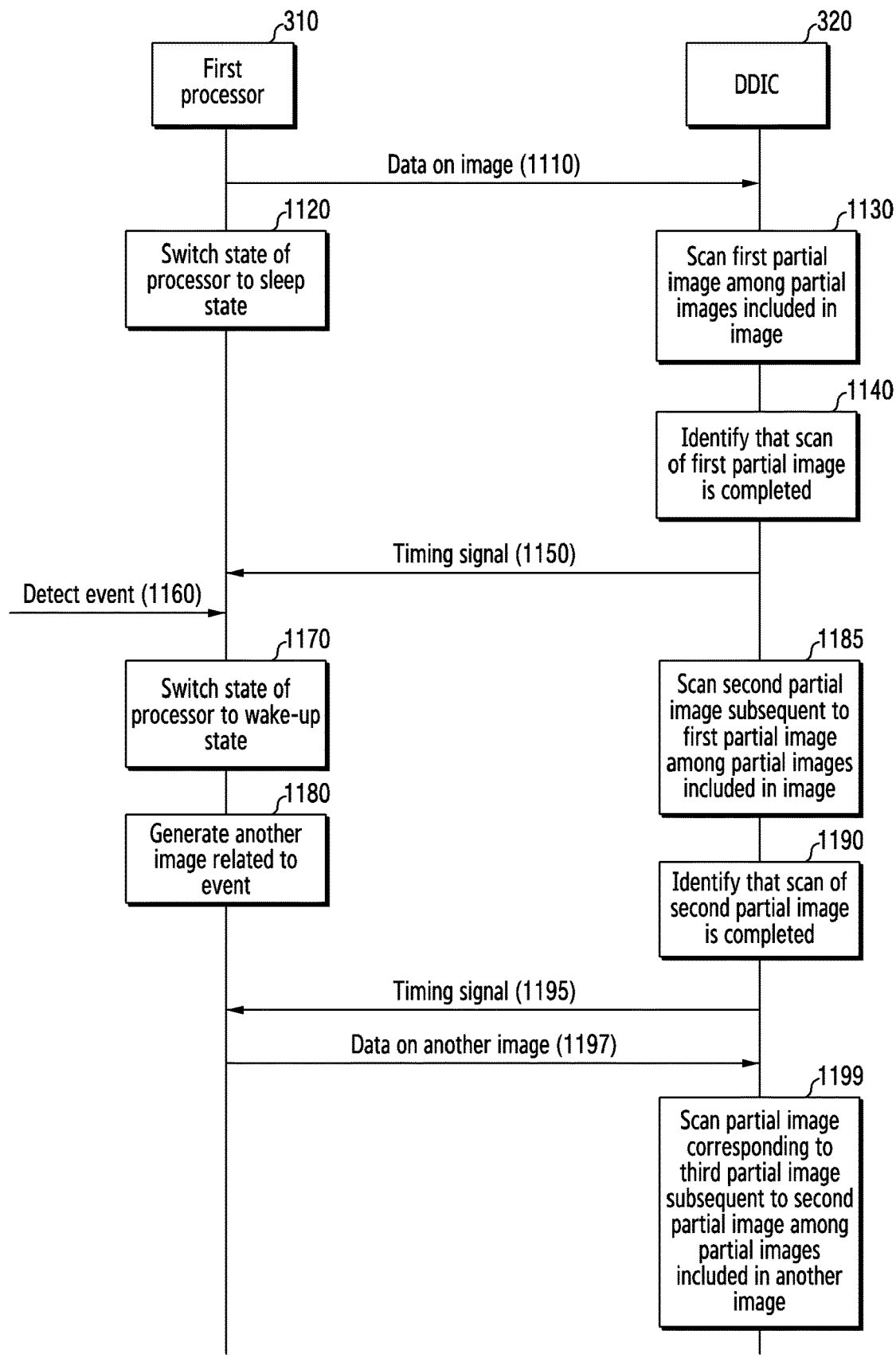
FIG. 11 illustrates a flowchart of the operation of the electronic device for transmitting a timing signal at a time point at which the scan is completed, according to an embodiment.

FIG. 11 illustrates a flowchart of the operation of the electronic device for transmitting the timing signal at the time point at which the scan is completed, according to an embodiment. The operation may be performed by the electronic device 101 illustrated in FIG. 1 or the electronic device 300 illustrated in FIG. 3.

Referring to FIG. 11, step 1110 to step 1140 may correspond to step 1010 to step 1040 of FIG. 10B. Thus, the descriptions with respect to step 1010 to step 1040 of FIG. 10B may also correspond to step 1110 to step 1140 of FIG. 11.

In step 1150, the first processor 310 receiving the timing signal from the DDIC 320 identifies that a change or an update of the image is not required and thus does not perform recording of data in the internal memory 322.

In step 1160, the first processor 310 receives an event detection signal from another element of the electronic device 300, such as the second processor 315 or the first processor 310 in the sleep state may generate the event detection signal.

In step 1170, the first processor 310 switches the state of the first processor 310 from the sleep state to the wake-up state based on the event detection signal. The first processor 310 may be switched to the wake-up state in order to change the image to another image based on the event detection signal.

In step 1180, the first processor 310 generates the other image related to the event. For example, the first processor 310 may generate the other image by inserting at least one visual object related to the event into each of a plurality of partial images included in the image.

In step 1185, the DDIC 320 scans a second partial image subsequent to a first partial image among the partial images included in the image in order to provide animation in the AOD mode.

In step 1190, the DDIC 320 identifies that the second partial image is completely scanned.

In step 1195, the DDIC 320 transmits the timing signal to the first processor 310 in response to the identification that the second partial image is completely scanned. The DDIC 320 may display the second partial image through the display panel 330 based on the identification that the second partial image is completely scanned. The first processor 310 may receive the timing signal.

In step 1197, the first processor 310 transmits data on the other image to the DDIC 320 based on the time point at which the timing signal is received. The data on the other image may be recorded or stored in the internal memory 322. Since the data on the other image is recorded in the internal memory 322 at the time point at which the completion of the scan is identified, the electronic device 300 may prevent the tearing effect.

In step 1199, the DDIC 320 scans the partial image corresponding to a third partial image subsequent to the second partial image among the partial images included in the other image newly recorded in the internal memory 322. For example, when the DDIC 320 scans the partial image 400-2 in step 1190, the DDIC 320 may scan the partial image 450-3 corresponding to the partial image 400-3 subsequent to the partial image 400-2 in step 1199.

Figure 12:
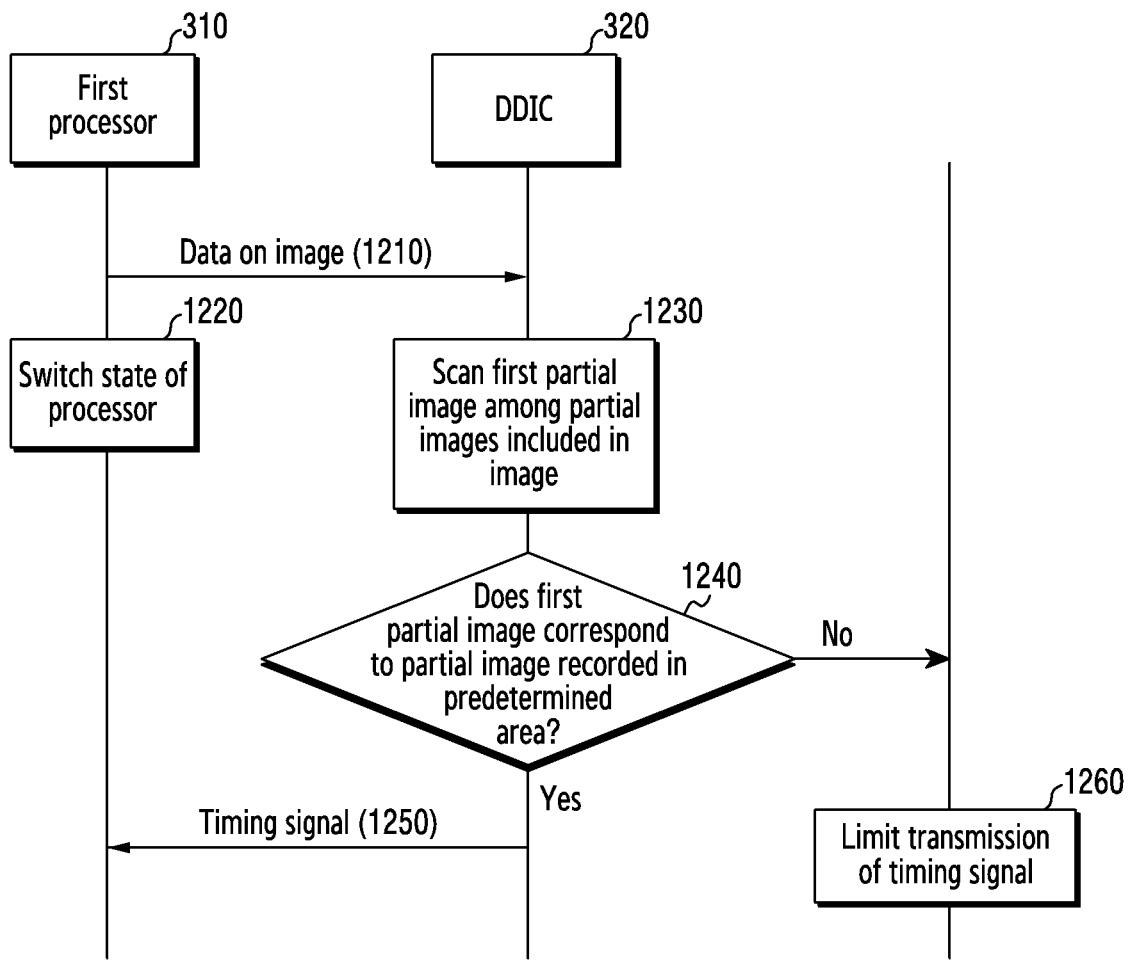
FIG. 12 illustrates a flowchart of the operation of the electronic device according to an embodiment.

FIG. 12 illustrates a flowchart of the operation of the electronic device, according to an embodiment. The operation may be performed by the electronic device 101 illustrated in FIG. 1 or the electronic device 300 illustrated in FIG. 3.

Referring to FIG. 12, in step 1210 the first processor 310 transmits data on the image to the DDIC 320. The first processor 310 may transmit the data on the image to be displayed in order to provide animation in the AOD mode to the DDIC 320. Partial images included in the image may be associated or concatenated with each other in order to provide the animation. The DDIC 320 may receive the data on the image and record or store the data on the image in the internal memory 322.

In step 1120, after transmitting the data on the image, the first processor 310 switches the state of the first processor 310 from the wake-up state to the sleep state in order to reduce power consumption.

In step 1230, the DDIC 320 scans a first partial image among the partial images included in the image stored in the internal memory 322. The first partial image may be a certain partial image among the partial images.

In step 1240, the DDIC 320 identifies whether the first partial image corresponds to a partial image recorded in a predetermined area among areas allocated to store data in the internal memory 322. The DDIC 320 may identify whether the first partial image corresponds to the partial image stored in the predetermined area in order to identify whether the timing signal is transmitted.

When it is identified that the first partial image corresponds to the partial image stored in the predetermined area, the DDIC 320 transmits the timing signal to the first processor 310 in step 1250. The predetermined area may be an area configured to prevent the time point at which the data within the internal memory 322 is scanned from being delayed so as to be subsequent to the time point at which the data is recorded in the internal memory 322. The first processor 310 may receive the timing signal. The first processor 310 may transmit information on another image to the DDIC 320 based on the timing signal.

When it is determined that the first partial image corresponds to a partial image stored in another area, different from the predetermined area, the DDIC 320 may limit the transmission of the timing signal to the first processor 310 in step 1260. When it is identified that the first partial image corresponds to the partial image stored in the other area, different from the predetermined area, the DDIC 320 may limit the transmission of the timing signal to the first processor 310 in order to prevent the tearing effect generated in the electronic device 300.

Figure 13:
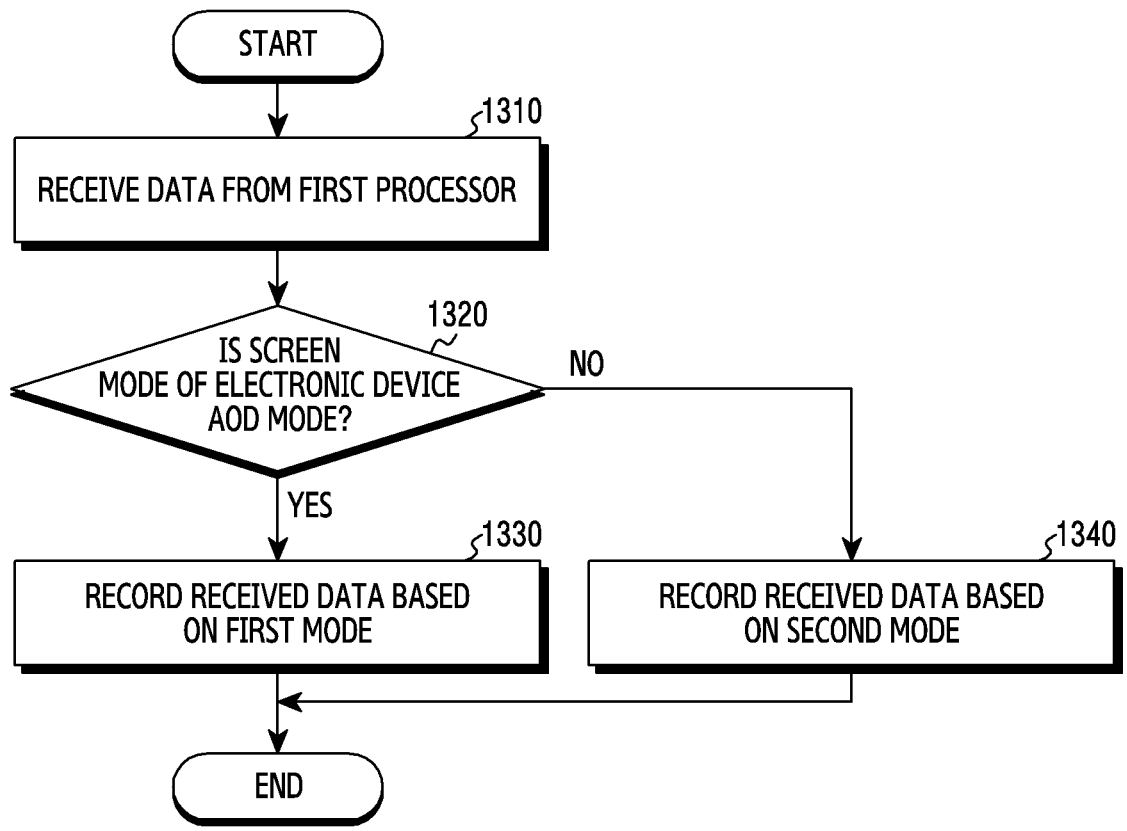
FIG. 13 illustrates a flowchart of the operation of the electronic device, according to an embodiment.

FIG. 13 illustrates a flowchart of the operation of the electronic device, according to an embodiment. The operation may be performed by the display device 160 included in the electronic device 101 illustrated in FIG. 1, the display driver IC 230 illustrated in FIG. 2, or the DDIC 320 included in the electronic device 300 illustrated in FIG. 3.

Referring to FIG. 13, the DDIC 320 receives data from the first processor 310 in step 1310. The data may be data stored in the internal memory 322 so as to display the screen through the display panel 330.

In step 1320, the DDIC 320 identifies whether the driving mode of the electronic device 300 is the AOD mode. For example, the DDIC 320 may identify whether the driving mode of the electronic device 300 is the AOD mode based at least on control information (or a command) provided from the first processor 310. When the driving mode is the AOD mode, the DDIC 320 performs step 1330. However, when the driving mode is the normal mode, the DDIC 320 performs step 1340.

The DDIC 320 records the data received from the first processor 310 according to a first mode based on the identification that the driving mode is the AOD mode in step 1330. The first mode may be a mode in which a start address at which the scanned data recorded in the internal memory 322 is distinguished from a start address at which the data is recorded in the internal memory 322. For example, the DDIC 320 operating in the first mode may perform the scan from a first address among a plurality of addresses set for the scan and the recording within the internal memory 322 when an interrupt for initiating the scan is generated, and may perform the recording of the data received from the first processor 310 at a second address before the first address among the plurality of addresses when an interrupt for initiating the recording is generated.

In step 1340, the DDIC 320 records the data received from the first processor 310 according to a second mode based on the identification that the driving mode is the normal mode. The second mode may be a mode in which the start address at which the scanned data is recorded in the internal memory 322 is not distinguished from the start address at which the data is recorded in the internal memory 322. For example, the DDIC 320 operating in the second mode may perform the scan from the first address, among the plurality of addresses, and may perform the recording from the first address when the interrupt for initiating the recording is generated.

As described above, the electronic device 300 may prevent the tearing effect while animation is provided in the AOD mode by distinguishing the recording mode used in the AOD mode from the recording mode used in the normal mode.

Figure 14:
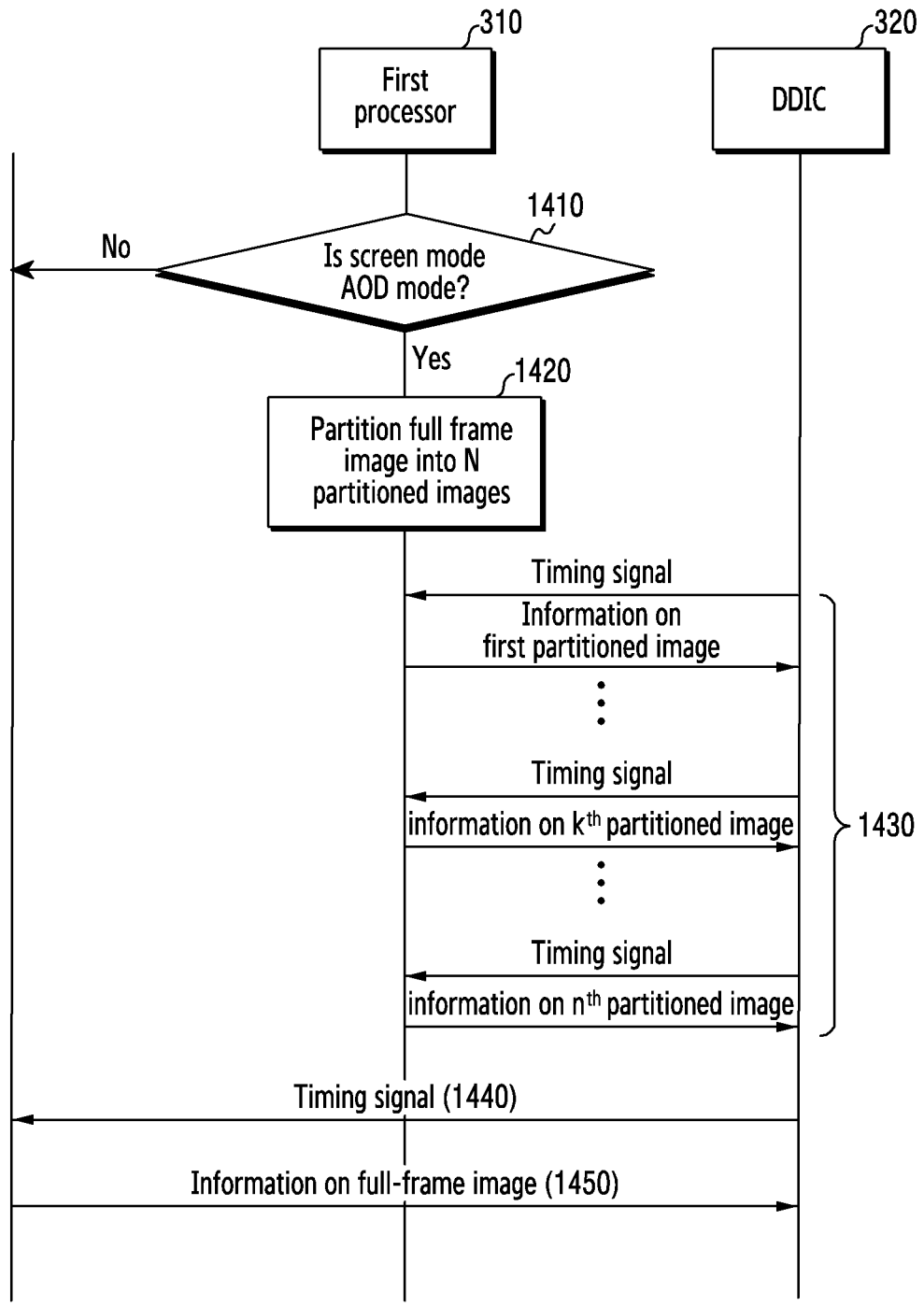
FIG. 14 illustrates a flowchart of the operation of the electronic device, according to an embodiment.

FIG. 14 illustrates a flowchart of the operation of the electronic device, according to an embodiment. The operation may be performed by the electronic device 101 illustrated in FIG. 1 or the electronic device 300 illustrated in FIG. 3.

Referring to FIG. 14, the first processor 310 identifies whether the driving mode is the AOD mode in step 1410. When the driving mode is the AOD mode, the first processor 310 performs step 1420. On the other hand, when the driving mode is the normal mode, the first processor 310 performs step 1440.

When the driving mode is the AOD mode, the first processor 310 partitions a full-frame image into N partitioned images in step 1420. For example, the first processor 310 may acquire the N partitioned images by partitioning the image such that at least one partial image in a horizontal direction is included in one partitioned image.

In step 1430, the DDIC 320 transmits the timing signal to the first processor 310. The DDIC 320 may transmit the timing signal to the first processor 310 at the predetermined period. The first processor 310 may receive the timing signal at the predetermined period and sequentially store the N partitioned images in the internal memory 322 by sequentially transmitting the N partitioned images to the DDIC 320 whenever the timing signal is received. For example, the first processor 310 may transmit each piece of information on a first partitioned image as information on an $n^{th}$ partitioned image whenever the timing signal is received as illustrated in FIG. 14.

Even though the DDIC 320 scans a certain partial image among a plurality of partial images included in the full-frame image in order to provide animation in the AOD mode through transmission of the plurality of partitioned images, the electronic device 300 may prevent the tearing effect while the animation is provided in the AOD mode since the area in which the partial image is scanned is located horizontally to the area of each of the plurality of partitioned images.

In step 1440, the DDIC 320 transmits the timing signal based on a predetermined period. The first processor 310 may receive the timing signal.

In step 1450, the first processor 310 transmits information on the full-frame image to the DDIC 320. Since the DDIC 320 performs the scan from a first area of the internal memory 322 in the normal mode, the first processor 310 may transmit information on the full-frame image to the DDIC 320 based on the time point at which the timing signal is periodically received. The DDIC 320 may receive the information on the full-frame image.

A method of the electronic device may include receiving, while the processor operates in an active state, from the processor, a first content including a plurality of images to be displayed based on a specified order through the display panel while the processor operates in a low-power state; storing the first content in the internal memory; changing a timing that will output a signal corresponding to a state capable of receiving a second content based on a change of a location in which an image among the plurality of images is displayed through the display panel by the display driving integrated circuit while the processor operates in the low-power state; and outputting the signal to the processor based on the changed timing.

The signal may include a signal for requesting to write a content, and the DDIC may be further configured to store, in the internal memory, the second content transmitted from the processor based on receiving the signal in the processor.

The second content may correspond to a content to which at least a portion of the first content is changed.

Changing the timing may include, if displaying the image in a second location changed from a first location in the display panel, changing the timing that will output the signal to a first timing; and if displaying the image in a third location changed from the first location in the display panel, changing the timing that will output the signal to a second timing distinct from the first timing.

Changing the timing may include changing another timing that scans data regarding the image based on the change of the location in which the image is displayed through the display panel; changing the timing that will output the signal based on the changed another timing; and outputting the signal to the processor based on the changed timing. For example, changing the timing may include changing the timing for outputting the signal to a timing at which the scanning initiated based on the changed another timing is completed; and outputting the signal may include an operation of outputting the signal to the processor based on the timing changed to the timing at which the scanning is completed.

A method of the electronic device may include, while the processor is in a sleep state, scanning a first partial image among a plurality of first partial images included in a first image stored in the internal memory; identifying that a scan of the first partial image is completed while the processor is in the sleep state; and transmitting a signal associated with a timing that writes data in the internal memory to the processor in response to the identification while the processor is in the sleep state.

The plurality of first partial images may be associated with each other such that an animation is displayed through the display panel while the processor is in the sleep state.

The method may further include displaying, through the display panel, the first partial image based on the scan while the processor is in the sleep state.

Scanning the first partial image by the DDIC may include scanning the first partial image among the plurality of first partial images included in the first image based on a timing indicated by a vertical synchronization signal generated in the DDIC while the processor is in the sleep state.

The method may further include transmitting the signal to the processor based on a specified period while the processor operates in a wake-up state.

The method may further include transmitting a second image including a plurality of second partial images to the DDIC based on receiving the signal from the DDIC; and switching a state of the processor from a wake-up state to the sleep state based on the transmission, wherein each of the plurality of second partial images corresponds to a partial image inserting at least one visual object into each of the plurality of first partial images, and the method may further include writing the second image in the internal memory; scanning a second partial image corresponding to a partial image subsequent to the first partial image among the plurality of second partial images while the processor is in the sleep state; and displaying the second partial image through the display panel while the processor is in the sleep state in response to identifying that a scan of the second partial image is completed.

The method may further include, while the processor is in the sleep state, transmitting, to the processor, the signal in response to identifying that the scan of the second partial image is completed.

The signal may include a TE signal.

The method of the electronic device may include scanning a first partial image, among a plurality of partial images included in an image written in the internal memory, while the processor is in a sleep state; identifying whether the first partial image corresponds to a partial image written in a designated area of the internal memory while the processor is in the sleep state; and, while the processor is in the sleep state, transmitting a signal for indicating a timing that writes data in the internal memory to the processor based on identifying that the first partial image corresponds to the partial image written in the designated area of the internal memory.

The method may include restricting transmitting the signal to the processor based on identifying that the first partial image corresponds to a partial image written in another area of the internal memory distinct from the designated area while the processor is in the sleep state.

For example, transmitting the signal to the processor may include restricting transmitting the signal to the processor by configuring the signal as a null state while the processor is in the sleep state based on identifying that the first partial image corresponds to the partial image written in the another area.

Alternatively, restricting transmitting the signal to the processor may further include restricting transmitting the signal to the processor by switching a state of a path between the processor and the DDIC associated with the signal from an active state to an inactive state based on identifying that the first partial image corresponds to the partial image written in the another area while the processor is in the sleep state.

The designated area may correspond to an area including a location initiating writing data within an entire area of the internal memory.

The method may further include transmitting another image to the DDIC based on receiving the signal from the DDIC; and switching a state of the processor from a wake-up state to the sleep state based on the transmission.

The method may further include transmitting the signal to the processor based on a specified period while the processor operates in a wake-up state.

The method may further include displaying the first partial image through the display panel based on the scan.

The method may include receiving data from the processor; and initiating storing of the data in an area corresponding to a first address before an initial address among a plurality of addresses configured in the internal memory.

A distance between the first address and the initial address may correspond to a length of a vertical porch of a vertical synchronization signal generated in the DDIC.

The method may further include performing a scan from the initial address among the plurality of addresses if performing a scan at a last address among the plurality of addresses; receiving another data from the processor; and initiating storing the another data in an area corresponding to a second address subsequent to a last address of an area in which the data is stored.

Receiving the data may include receiving the data from the processor while the electronic device operates in an AOD mode; and initiating storing the data in an area corresponding to the first address previous to the initial address among the plurality of addresses configured in the internal memory while the electronic device operates in the AOD mode.

The methods stated in claims may be implemented by hardware, software, or a combination of hardware and software.

When the methods are implemented by software, a computer-readable storage medium for storing one or more programs (for example, software modules) may be provided. The one or more programs stored in the computer-readable storage medium may be configured for execution by one or more processors within the electronic device and may include instructions that cause the electronic device to perform the methods of the present disclosure as defined by the appended claims and/or disclosed herein.

The programs may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the non-volatile memories may form a memory in which the program is stored. Further, a plurality of such memories may be included in the electronic device.

In addition, the programs may be stored in an attachable storage device which is accessible through communication networks such as the Internet, the Intranet, a local area network (LAN), a wide area network (WAN), and a storage area network (SAN), or a combination thereof. Such a storage device may access the electronic device via an external port. Further, a separate storage device on the communication network may access a portable electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
    a display panel;
    a processor; and
    display driving integrated circuitry (DDIC) configured to control the display panel, the DDIC including an internal memory,
    wherein the DDIC is configured to:
        while the processor operates in an active state, receive, from the processor, a first content including a plurality of images to be displayed based on a specified order through the display panel while the processor operates in a low-power state;
        store the first content in the internal memory;
        change a timing for outputting a signal corresponding to a state capable of receiving a second content based on a change of a location in which an image among the plurality of images is displayed through the display panel while the processor operates in the low-power state; and
        output the signal to the processor based on the changed timing.

2. The electronic device of claim 1, wherein the signal requests to write a content, and
    wherein the DDIC is further configured to store the second content transmitted from the processor in the internal memory based on receiving the signal in the processor.

3. The electronic device of claim 1, wherein the second content is a content in which at least a portion of the first content is changed.

4. The electronic device of claim 1, wherein the DDIC is further configured to:
    if displaying the image in a second location changed from a first location in the display panel, change the timing for outputting the signal to a first timing; and
    if displaying the image in a third location changed from the first location in the display panel, change the timing for outputting the signal to a second timing distinct from the first timing.

5. The electronic device of claim 1, wherein the DDIC is further configured to:
    change another timing for scanning data regarding the image based on the change of the location in which the image is displayed through the display panel;
    change the timing for outputting the signal based on the changed another timing; and
    output the signal to the processor based on the changed timing for outputting the signal.

6. The electronic device of claim 5, wherein the DDIC is further configured to:
    change the timing for outputting the signal to a timing at which the scanning initiated based on the changed another timing is completed; and
    output the signal to the processor based on the timing changed to the timing at which the scanning is completed.

* * * * *